(12) United States Patent
Higdon et al.

(10) Patent No.: US 10,547,071 B2
(45) Date of Patent: Jan. 28, 2020

(54) ENERGY LOAD MANAGEMENT SYSTEM

(71) Applicant: BLOOM ENERGY CORPORATION, Sunnyvale, CA (US)

(72) Inventors: David Higdon, Sunnyvale, CA (US); David Weingaertner, Sunnyvale, CA (US); Ali Zargari, Santa Clara, CA (US); Suthitham Kusolasak, Santa Clara, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 198 days.

(21) Appl. No.: 15/637,268

(22) Filed: Jun. 29, 2017

(65) Prior Publication Data

US 2017/0301934 A1   Oct. 19, 2017

Related U.S. Application Data

(62) Division of application No. 14/054,010, filed on Oct. 15, 2013, now abandoned.
(Continued)

(51) Int. Cl.
| | | |
|---|---|---|
| *H01M 8/04746* | (2016.01) | |
| *H01M 8/04089* | (2016.01) | |
| *H01M 8/0662* | (2016.01) | |
| *H01M 8/0612* | (2016.01) | |
| *H01M 8/04858* | (2016.01) | |

(Continued)

(52) U.S. Cl.
CPC ..... *H01M 8/04753* (2013.01); *H01M 4/9033* (2013.01); *H01M 4/9066* (2013.01); *H01M 8/04014* (2013.01); *H01M 8/0491* (2013.01); *H01M 8/04097* (2013.01); *H01M 8/04373* (2013.01); *H01M 8/0618* (2013.01);
(Continued)

(58) Field of Classification Search
CPC ......... H01M 8/04753; H01M 8/04343; H01M 8/0435; H01M 8/04365; H01M 8/0473; H01M 8/04097; H01M 8/0447; H01M 8/0491; H01M 8/0494; H01M 8/0618; H01M 8/0662
See application file for complete search history.

(56) References Cited

U.S. PATENT DOCUMENTS

| 4,046,956 A | 9/1977 | Fanciullo |
|---|---|---|
| 5,257,180 A | 10/1993 | Sashida et al. |

(Continued)

FOREIGN PATENT DOCUMENTS

| KR | 10-2009-0085973 | 8/2009 |
|---|---|---|
| WO | WO 2009-105191 A2 | 8/2009 |

OTHER PUBLICATIONS

International Search Report & Written Opinion, International Application No. PCT/US2011/060604, dated May 25, 2012.
(Continued)

*Primary Examiner* — Jonathan G Jelsma
(74) *Attorney, Agent, or Firm* — The Marbury Law Group PLLC

(57) ABSTRACT

A system and method for controlling a fuel cell system. An anode tail gas oxidizer (ATO) receives air and fuel exhaust streams from one or more fuel cell stacks of the fuel cell system. The one or more fuel cell stacks provide current to one or more loads. An ATO temperature signal is used to control at least one of a fuel inlet flow to the one or more fuel cell stacks or the current provided to the one or more loads.

18 Claims, 15 Drawing Sheets

Related U.S. Application Data

(60) Provisional application No. 61/714,302, filed on Oct. 16, 2012.

(51) Int. Cl.
*H01M 8/0432* (2016.01)
*H01M 4/90* (2006.01)
*H01M 8/04014* (2016.01)
*H01M 8/1253* (2016.01)
*H01M 8/124* (2016.01)

(52) U.S. Cl.
CPC ....... *H01M 8/0662* (2013.01); *H01M 8/1253* (2013.01); *H01M 2008/1293* (2013.01)

(56) References Cited

U.S. PATENT DOCUMENTS

| | | | |
|---|---|---|---|
| 5,262,935 A | 11/1993 | Shirahama et al. | |
| 6,362,540 B1 | 3/2002 | Hill | |
| 6,757,590 B2 | 6/2004 | Ross et al. | |
| 7,061,139 B2 | 6/2006 | Young et al. | |
| 7,564,703 B1 | 7/2009 | Braun et al. | |
| 7,599,760 B2 | 10/2009 | Dutta et al. | |
| 7,705,490 B2 | 4/2010 | Srinivasan et al. | |
| 7,713,649 B2 | 5/2010 | Hickey et al. | |
| 8,148,023 B2 | 4/2012 | Schriever et al. | |
| 8,211,583 B2 | 7/2012 | Weingaertner et al. | |
| 8,263,276 B1 | 9/2012 | Gurunathan et al. | |
| 8,563,180 B2 | 10/2013 | Perry et al. | |
| 2002/0027791 A1 | 3/2002 | Yoshioka et al. | |
| 2003/0031903 A1 | 2/2003 | Peschke et al. | |
| 2003/0111842 A1 | 6/2003 | Gilbreth et al. | |
| 2003/0224231 A1* | 12/2003 | Penev | H01M 8/04022 429/423 |
| 2004/0028968 A1 | 2/2004 | Okamoto | |
| 2004/0053082 A1 | 3/2004 | McCluskey et al. | |
| 2004/0164702 A1 | 8/2004 | Holmes | |
| 2008/0042615 A1 | 2/2008 | Serrels et al. | |
| 2008/0053716 A1 | 3/2008 | Scheucher | |
| 2008/0067869 A1 | 3/2008 | Evans et al. | |
| 2008/0152962 A1 | 6/2008 | Poonamallee et al. | |
| 2009/0030712 A1 | 1/2009 | Bogolea et al. | |
| 2009/0115375 A1 | 5/2009 | Iida | |
| 2009/0273240 A1 | 11/2009 | Gurunathan et al. | |
| 2010/0009221 A1 | 1/2010 | Ballantine et al. | |
| 2010/0013317 A1 | 1/2010 | Ballantine et al. | |
| 2010/0188869 A1 | 7/2010 | Fredette et al. | |
| 2010/0239924 A1 | 9/2010 | McElroy et al. | |
| 2011/0008687 A1 | 1/2011 | Ballantine et al. | |
| 2011/0011362 A1 | 1/2011 | Sridhar et al. | |
| 2011/0258112 A1 | 10/2011 | Eder et al. | |
| 2011/0281185 A1 | 11/2011 | Sridhar et al. | |
| 2012/0091964 A1 | 4/2012 | Vance et al. | |
| 2012/0098336 A1 | 4/2012 | Gurunathan et al. | |
| 2012/0146587 A1 | 6/2012 | Srinivasan et al. | |
| 2012/0270117 A9 | 10/2012 | Venkataraman et al. | |
| 2013/0020875 A1 | 1/2013 | Wozniak et al. | |

OTHER PUBLICATIONS

International Search Report & Written Opinion, International Application No. PCT/US2011/057440, dated Apr. 27, 2012.
Choi et al., "Fuel Cell Powered UPS Systems: Design Considerations," Power Electronics Specialist Conference, 2003, IEEE 34th Annual (vol. 1 ).
International Search Report and written opinion received in connection with International Application No. PCT/US2013/065012; dated Jan. 22, 2014.
International Preliminary Report on Patentability received in connection with International Application No. PCT/US2013/065012; dated Apr. 30, 2015.

* cited by examiner

ENERGY LOAD MANAGEMENT SYSTEM

RELATED APPLICATIONS

This application is a Divisional of U.S. Non-Provisional application Ser. No. 14/054,010, filed Oct. 15, 2013, which claims the benefit of priority of U.S. Provisional Patent Application No. 61/714,302 filed Oct. 16, 2012, the entire contents of which are incorporated by reference herein.

BACKGROUND

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

In a high temperature fuel cell system, such as a solid oxide fuel cell (SOFC) system, an oxidizing flow is passed through the cathode side of the fuel cell while a fuel inlet flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

In order to optimize the operation of SOFCs, the oxidizing and fuel flows should be precisely regulated. Understanding the interaction between the loads and the power plant facilitates achieving the best availability and efficiency. Normally a load connects to the plant, the bus voltage sags, and then the plant adds fuel to maintain a set bus voltage. This forces the power plant to always run extra fuel to avoid overloading or blacking out. Operating with extra fuel or lower fuel utilization is not an option for high efficiency operation, and thus batteries or other energy storage devices are used to prevent overloading events.

SUMMARY

Embodiments are directed to systems and methods for controlling a fuel cell system.

According to one embodiment, a method and system for controlling a fuel cell system are provided. The fuel cell system comprises one or more fuel cell stacks. The method comprises receiving from a sensor a temperature signal indicative of a temperature of an anode tail gas oxidizer (ATO), wherein the ATO receives air and fuel exhaust streams from the one or more fuel cell stacks and wherein the one or more fuel cell stacks provide current to one or more loads, and controlling at least one of a fuel inlet flow to the one or more fuel cell stacks or the current provided to the one or more loads using the ATO temperature signal.

According to another embodiment, a method for controlling a fuel cell system comprises receiving from a load a request for additional current at the fuel cell system, determining if additional current is available from the fuel cell system based on a smallest of air flow provided to the fuel cell system, a fuel inlet flow provided to the fuel cell system, and a measure of additional current that may be supplied by the fuel cell system, and providing the additional current to the load from the fuel cell system without varying fuel or air flow to the fuel cell system if the additional current is available.

According to another embodiment, a method for connecting a load to a fuel cell system comprises receiving by a controller a signal demand signal from a load, wherein the load demand signal is indicative of the load requesting connection to a fuel cell system power output bus, delaying the connection of the load to the fuel cell system power output bus, initiating or increasing a fuel inlet flow rate delivered to the fuel cell system in response to the demand signal, and connecting the load to the fuel cell system power output bus when the fuel inlet flow rate is equal to or greater than a fuel inlet flow rate required to provide power required by the load.

According to another embodiment, a method for controlling a connection between a plurality of loads and an output of a fuel cell system comprises receiving a signal indicative of at least one of voltage of a middle bus of a power output bus and a fuel utilization measure of the fuel cell system, and signaling a relay to connect or disconnect one or more of the plurality of loads from the fuel cell system power output bus in response to the signal.

According to another embodiment, a method for controlling power supplied to a plurality of loads comprises receiving an output voltage of a bus, wherein the bus is supplied power by a plurality of fuel cell modules having different power outputs and wherein the bus supplies power to the plurality of loads, receiving state information of the plurality of loads, sending a same single control signal to the plurality of fuel cell modules in response to the output voltage of the bus and state information of the plurality of loads, and adjusting the power output of one or more of the plurality of fuel cell modules in response to the control signal.

DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the phrase "power generation system" encompasses a collection of fuel cell systems that are interconnected to provide power to one or more loads. A power generation system may include one or more fuel cell plants as well as other devices that use fuel to produce electrical power. A fuel cell plant encompasses a collection of modules containing at least one hot box. A hot box contains one or more fuel stacks, such as plural SOFC stacks and balance of plant components.

A sample fuel cell system is described in U.S. Published Application 2010/0009221 published on Jan. 14, 2010 (filed as Ser. No. 12/458,171 and incorporated herein by reference in its entirety). The components of a sample fuel cell system hot box are described in U.S. application Ser. No. 13/344,077, filed Jan. 5, 2012 and incorporated herein by reference in its entirety.

The various embodiments provide systems and methods for load management that may improve fuel cell system efficiency of a power generation system.

As used herein "load management" encompasses systems and processes that are operated to manage a fuel cell system to "follow" a load and/or to shed a load by selecting loads to which power from the fuel cell plant(s) is to be turned on and off.

During steady state fuel cell system operation, efficiency may be optimized by matching fuel input to the fuel cell system to the load power requirements while matching transients as closely as possible. Fuel flow to the fuel cell modules is typically controlled using control valves. When a load is added, (i.e., a load needs power from the fuel cell system), the current demand cannot be satisfied until the fuel cell system receives additional fuel. Additionally, the demand for current may only be satisfied up to the maximum safe output of the fuel cell system. Controlling the current demand and the fuel flow simultaneously requires information about the amount of fuel available to the fuel cell system at a particular time.

Embodiments utilize information about the state of a fuel cell system that is obtained from the ATO to match fuel supplied to a fuel cell system and power provided to one or more loads supplied by the fuel cell system. The operation of the ATO in a fuel cell system is described below.

Figure 1:
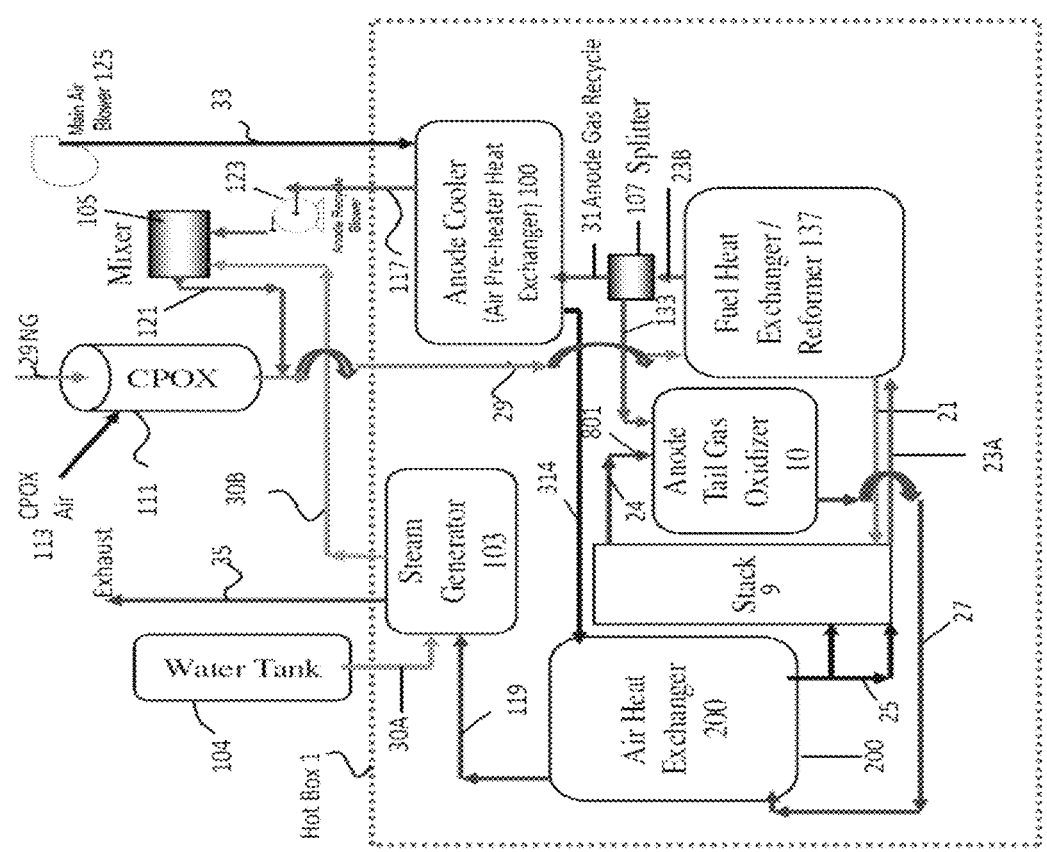
FIG. 1 is a block diagram illustrating various components and flows through a fuel cell system according to an embodiment.

FIG. 1 is a block diagram illustrating various components and flows through a fuel cell system according to an embodiment as described in U.S. application Ser. No. 13/344,077, filed Jan. 5, 2012.

As illustrated in FIG. 1, fuel and air are supplied to a fuel cell stack 9 housed in a hot box 1. The hot box 1 contains the plurality of the fuel cell stacks 9, such as solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The stacks 9 may be arranged over each other in a plurality of columns.

The hot box 1 also contains a steam generator 103. The steam generator 103 is provided with water through conduit 30A from a water source 104, such as a water tank or a water pipe (i.e., a continuous water supply), and converts the water to steam. The steam is provided from generator 103 to mixer 105 through conduit 30B and is mixed with the stack anode (fuel) recycle stream in the mixer 105. The mixer 105 may be located inside or outside of the hot box 1. Preferably, the humidified anode exhaust stream is combined with the fuel inlet stream in the fuel inlet line or conduit 29 downstream of the mixer 105, as schematically shown in FIG. 1. Alternatively, if desired, the fuel inlet stream may also be provided directly into the mixer 105, or the steam may be provided directly into the fuel inlet stream and/or the anode exhaust stream may be provided directly into the fuel inlet stream followed by humidification of the combined fuel streams.

The steam generator 103 is heated by the hot ATO 10 exhaust stream which is passed in heat exchange relationship in conduit 119 with the steam generator 103.

The system operates as follows. The fuel inlet stream, such as a hydrocarbon stream, for example natural gas, is provided into the fuel inlet conduit 29 and through a catalytic partial pressure oxidation (CPOx) 111 located outside the hot box 1. During system start up, air is also provided into the CPOx reactor 111 through CPOx air inlet conduit 113 to catalytically partially oxidize the fuel inlet stream. During steady state system operation, the air flow is turned off and the CPOx reactor acts as a fuel passage way in which the fuel is not partially oxidized. Thus, the hot box 1 may comprise only one fuel inlet conduit which provides fuel in both start-up and steady state modes through the CPOx reactor 111. Therefore a separate fuel inlet conduit which bypasses the CPOx reactor during steady state operation is not required.

The fuel inlet stream is provided into the fuel heat exchanger (anode recuperator)/pre-reformer 137 where its temperature is raised by heat exchange with the stack 9 anode (fuel) exhaust stream. The fuel inlet stream is pre-reformed in the pre-reformer section of the heat exchanger 137 via the SMR reaction and the reformed fuel inlet stream (which includes hydrogen, carbon monoxide, water vapor and unreformed methane) is provided into the stacks 9 through the fuel inlet conduit(s) 21. Additional reformation catalyst may be located in conduit(s) 21. The fuel inlet stream travels upwards through the stacks through fuel inlet risers in the stacks 9 and is oxidized in the stacks 9 during electricity generation. The oxidized fuel (i.e., the anode or fuel exhaust stream) travels down the stacks 9 through the fuel exhaust risers and is then exhausted from the stacks through the fuel exhaust conduit(s) 23A into the fuel heat exchanger 137.

In the fuel heat exchanger 137, the anode exhaust stream heats the fuel inlet stream via heat exchange. The anode exhaust stream is then provided via the fuel exhaust conduit 23B into a splitter 107. A first portion of the anode exhaust stream is provided from the splitter 107 into the ATO 10 via conduit (e.g., slits) 133.

A second portion of the anode exhaust stream is recycled from the splitter 107 into the anode cooler 100 and then into the fuel inlet stream. For example, the second portion of the anode exhaust stream is recycled through conduit 31 into the anode cooler (i.e., air pre-heater heat exchanger) where the anode exhaust stream pre-heats the air inlet stream from conduit 33. The anode exhaust stream is then provided by the anode recycle blower 123 into the mixer 105. The anode exhaust stream is humidified in the mixer 105 by mixing with the steam provided from the steam generator 103. The humidified anode exhaust stream is then provided from the mixer 105 via humidified anode exhaust stream conduit 121 into the fuel inlet conduit 29 where it mixes with the fuel inlet stream.

The air inlet stream is provided by a main air blower 125 from the air inlet conduit 33 into the anode cooler heat exchanger 100. The blower 125 may comprise the single air flow controller for the entire system. In the anode cooler heat exchanger 100, the air inlet stream is heated by the anode exhaust stream via heat exchange. The heated air inlet stream is then provided into the air heat exchanger (cathode recuperator 200) via conduit 314. The heated air inlet stream is provided from heat exchanger 200 into the stack(s) 9 via the air inlet conduit and/or manifold 25.

The air passes through the stacks 9 into the cathode exhaust conduit 24 and through conduit 24 and mixer 801 into the ATO 10. In the ATO 10, the air exhaust stream oxidizes the split first portion of the anode exhaust stream from conduit 133 to generate an ATO exhaust stream. The ATO exhaust stream is exhausted through the ATO exhaust conduit 27 into the air heat exchanger 200. The ATO exhaust stream heats air inlet stream in the air heat exchanger 200 via heat exchange. The ATO exhaust stream (which is still above room temperature) is then provided from the air heat exchanger 200 to the steam generator 103 via conduit 119. The heat from the ATO exhaust stream is used to convert the water into steam via heat exchange in the steam generator 103. The ATO exhaust stream is then removed from the system via the exhaust conduit 35. Thus, by controlling the air inlet blower output (i.e., power or speed), the magnitude (i.e., volume, pressure, speed, etc.) of air introduced into the system may be controlled. The cathode (air) and anode (fuel) exhaust streams are used as the respective ATO air and fuel inlet streams, thus eliminating the need for a separate ATO air and fuel inlet controllers/blowers. Furthermore, since the ATO exhaust stream is used to heat the air inlet stream, the control of the rate of single air inlet stream in conduit 33 by blower 125 can be used to control the temperature of the stacks 9 and the ATO 10.

Thus, by varying the main air flow in conduit 33 using a variable speed blower 125 and/or a control valve to maintain the stack 9 temperature and/or ATO 10 temperature. The main air flow rate control via blower 125 or valve acts as a main system temperature controller. Furthermore, the ATO 10 temperature may be controlled by varying the fuel utilization (e.g., ratio of current generated by the stack(s) 9 to fuel inlet flow provided to the stack(s) 9). Finally the anode recycle flow in conduits 31 and 117 may be controlled by a variable speed anode recycle blower 123 and/or a control valve to control the split between the anode exhaust to the ATO 10 and anode exhaust for anode recycle into the mixer 105 and the fuel inlet conduit 29.

In this embodiment, there are no external fuel and air inputs to the ATO 10. Thus, in contrast to prior art systems, external natural gas or another external fuel is not fed to the ATO 10. Instead, the hot fuel (anode) exhaust stream from the fuel cell stack(s) 9 is partially recycled into the ATO as the ATO fuel inlet stream. Likewise, there is no outside air input into the ATO. Instead, the hot air (cathode) exhaust stream from the fuel cell stack(s) 9 is provided into the ATO as the ATO air inlet stream.

Furthermore, the fuel exhaust stream is split in a splitter 107 located in the hot box 1. The splitter 107 is located between the fuel exhaust outlet of the anode recuperator (e.g., fuel heat exchanger) 137 and the fuel exhaust inlet of the anode cooler 100 (e.g., the air pre-heater heat exchanger). Thus, the fuel exhaust stream is split between the mixer 105 and the ATO 10 prior to entering the anode cooler 100. This allows higher temperature fuel exhaust stream to be provided into the ATO 10 than in the prior art because the fuel exhaust stream has not yet exchanged heat with the air inlet stream in the anode cooler 100. For example, the fuel exhaust stream provided into the ATO 10 from the splitter 107 may have a temperature of above 350 C, such as 350-500 C, for example 375 to 425 C, such as 390-410 C. Furthermore, since a smaller amount of fuel exhaust is provided into the anode cooler 100 (e.g., not 100% of the anode exhaust is provided into the anode cooler due to the splitting of the anode exhaust in splitter 107), the heat exchange area of the anode cooler 100 described above may be reduced.

Load Following

In one embodiment of the invention, this configuration of the ATO 10 in FIG. 1 also facilitates using the temperature of the ATO as a measure of the flow of fuel into the stack 9. Because external air and external fuel are not introduced into ATO 10 and because the fuel exhaust stream is introduced to the ATO 10 before cooling in the anode cooler 100, the temperature in the ATO 10 is a function of unused (excess) fuel that is emitted by the stack 9 for a fixed air exhaust stream flow. Embodiments hereof utilize the temperature of the ATO to manage loading of the fuel cell system.

The ATO temperature is a function of the amount of unused air and fuel in the respective exhaust streams that are oxidized in the ATO. If the fuel and air exhaust stream flows are held constant (e.g., if the fuel recycle blower 123 rate is held constant), then the temperature of the ATO will be reduced when more load is added (increasing the current drawn from the fuel cell system) and when the fuel flow into the fuel cell system is reduced. For constant fuel and air inlet and exhaust stream flows, the temperature of the ATO will increase when the load is reduced (decreasing the current drawn from the fuel cell system) and/or when the fuel flow into the fuel cell system is increased. Under these conditions, the temperature of the ATO may be used as a measure of the state of the fuel cell system and may be used to signal changes in the load(s) current demand connected to the fuel cell system and/or the amount of fuel supplied to the fuel cell system Thus, if the ATO temperature is higher than a desired temperature, then it means that unutilized fuel is present in the fuel cell system, such as due to an insufficient electrical load applied to the system and/or to a higher than needed fuel inlet stream supply rate and/or to a higher than needed fuel exhaust stream recycle into the fuel inlet stream rate. This fuel underutilization may be remedied by increasing an electrical load to the fuel cell system and/or by decreasing at least one of the fuel inlet and fuel exhaust recycle rates until the ATO temperature reaches the desired temperature range or point. As used herein, increasing the electrical load includes adding one or more additional loads to the system and/or increasing the amount of power provided to an existing load. If desired, the air inlet stream rate may also be increased to decrease the ATO temperature. In contrast, if the ATO temperature is lower than a desired temperature, then it means that insufficient fuel is present in the fuel cell system for the applied electrical load. This condition may be remedied by decreasing an electrical load to the fuel cell system and/or by increasing at least one of the fuel inlet and fuel exhaust recycle rates until the ATO temperature reaches the desired temperature range or point.

Thus, a method according the present embodiment includes receiving from a sensor (e.g., thermocouple or another temperature sensor) a temperature signal indicative of a temperature of an anode tail gas oxidizer (ATO), and controlling at least one (or both) of a fuel inlet flow to the one or more fuel cell stacks or the current provided to the one or more loads using the ATO temperature signal.

Preferably, the step of controlling includes determining whether the measured ATO temperature exceeds an ATO set point temperature by a predetermined value, and varying a magnitude of least one of a fuel inlet flow to the one or more fuel cell stacks or the current provided to the one or more loads in response to the ATO temperature signal. This preferred direct control of the magnitude of the fuel inlet flow and/or load current is different from merely delaying an increase in magnitude of the load current until the measured ATO temperature reaches a predetermined temperature.

Figure 2A:
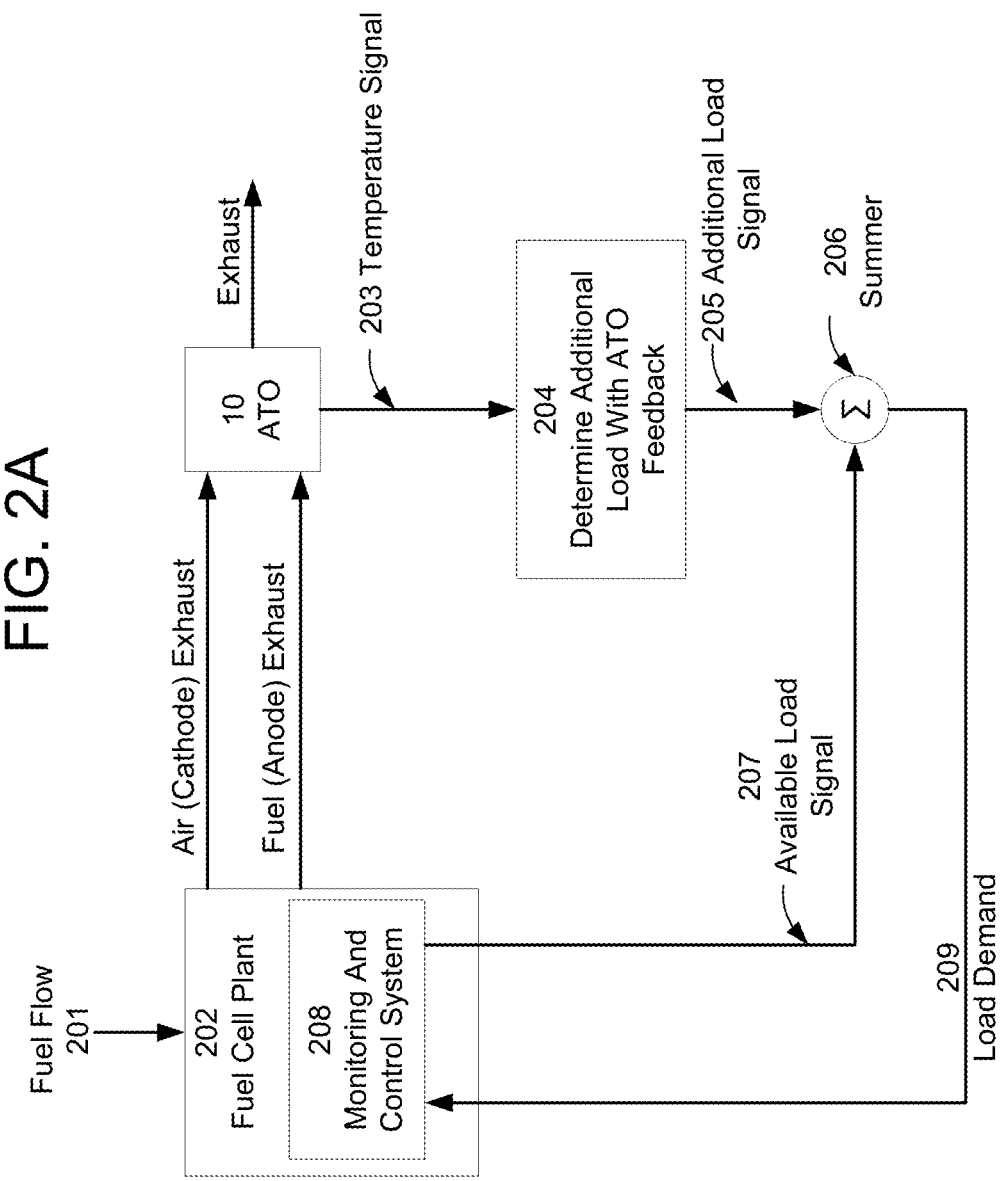
FIG. 2A is a block diagram of a circuit that utilizes the temperature of an anode tail gas oxidizer (ATO) 10 to signal an increase or a decrease in the load (i.e., current demand) on a fuel cell system according to an embodiment.

FIG. 2A is a block diagram of a circuit that utilizes the temperature of an anode tail gas oxidizer (ATO) 10 to signal an increase or a decrease in the load (i.e., current demand) on a fuel cell system according to an embodiment.

As illustrated in FIG. 2A, a fuel inlet stream 201 is provided to a fuel cell plant 202 (e.g., via conduit 29 in FIG. 1). The fuel cell plant 202 (i.e., fuel cell stacks 9) sends the fuel and air exhaust streams to the ATO 10. In an embodiment, a fuel cell monitoring and control system 208 determines the additional load (i.e., additional current or power output) that may be applied to the fuel cell plant or system based on fuel utilization, the existing load (i.e., the current or power output of the fuel cell system at a given time) and the ATO temperature. An additional load signal 205 based on the fuel utilization from a controller 204 and an available load signal 207 from the monitoring and control system 208 are provided to a summer 206. As used herein, a signal may be provided wirelessly or via a physical connection, such as an electrical wire or via a fiber optic connection. A measured temperature of the ATO and/or the rate of change of ATO temperature signal 203 is provided from a sensor (e.g., ATO thermocouple) to the controller 204. The controller 204 may be the same or different controller as the system 208. The controller 204 determines if excess fuel is available in the fuel cells system and whether the additional load can be applied to the fuel cell system and communicates the additional load signal to the summer 206. The summer combines the additional load signal 205 with the available load signal 207 to produce a load demand signal 209. The load demand signal indicates whether the load can be increased based on available fuel, and the load demand signal 209 is communicated to the monitoring and control system 208. System 208 then increases, decreases or maintains the same load magnitude on the fuel cell plant or system 202. As more load is applied, the capacity of the fuel cell plant is approached (that is, the available load signal 207 approaches zero) and the fuel cell plant reaches maximum capacity. Additionally, the temperature of the ATO 10 declines (assuming the fuel exhaust stream rate provided to the ATO 10 remains constant). The fuel cell system reaches steady state operation with the new load and the additional load signal 205 also approaches zero.

Figure 2B:
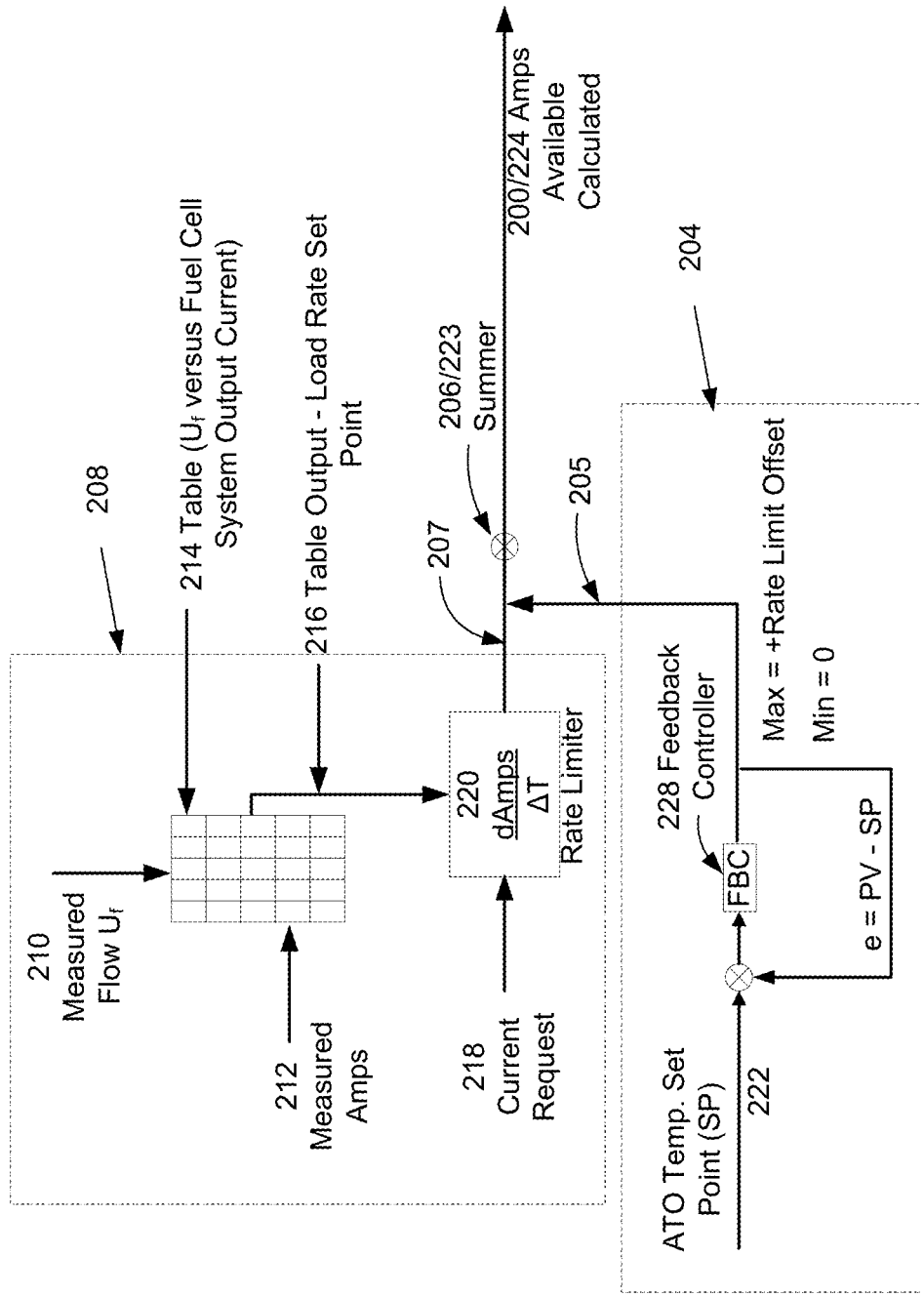
FIG. 2B is a block diagram illustrating an implementation of the circuit illustrated in FIG. 2A according to an embodiment.

FIG. 2B illustrates a non-limiting circuit implementation of the functional circuit diagram shown in FIG. 2A. In this embodiment, a two dimensional lookup table 214 is used to obtain a predetermined allowable load rate expressed as $\partial I/\Delta T$ (i.e., amps/ATO temperature rate of change) set point 216 from a determined fuel utilization $U_f$ 210 and measured system output current (in amps) 212. The fuel utilization 210 is determined by measuring the fuel exhaust stream flow rate (e.g., by determining the fuel recycle blower 123 rate or by measuring the flow rate using a flow meter) and then calculating the fuel utilization. The allowable load rate set point 216 output from table 214 and a current request 218 (e.g., from a load or from the system controller 208) are provided to a rate limiter 220. The current limiter 220 establishes an estimate of load rate that may be applied to meet the current request 218 using $\partial I/\Delta T$. The lookup table 214 and the rate limiter 220 may comprise a portion of the system controller 208 (i.e., the monitoring and control system 208 shown in FIG. 2A). The limiter 220 outputs the available load signal 207 to the summer 206/223.

The controller 204 shown in FIG. 2A includes a feedback controller 228 (such as a PID or another suitable feedback controller) shown in FIG. 2B. The feedback controller 228 compares the actual temperature of the ATO 10 (signal 203 in FIG. 2A, which is denoted as "PV" in FIG. 2B) with the temperature set point (SP) 222 of the ATO 10. The output of the feedback controller 228 is limited by a minimum value of 0 (when PV=SP) and by a maximum allowed rate limit offset. The maximum allowed rate limit offset prevents the load from being increased beyond a safe value in response to extremely high ATO temperature. For example, the ATO temperature set point SP (i.e., the desired ATO temperature point or range) may be provided to the controller as a current or voltage signal via a wire or as a wireless signal having a predetermined amplitude. The measured ATO temperature signal 203/PV may be provided as a current or voltage to the controller 228 via a wire from a thermocouple or other ATO temperature measurement device. The controller 228 outputs the additional load signal 205 (e.g., a voltage or current) to the summer 206/233. The summer 206/233 then sums the current or voltage signals 205 and 207 and outputs the load demand signal 209/224 (e.g., a current or voltage or a wireless signal having a certain amplitude and/or frequency) to the control system 209 and/or directly to the load.

By way of illustration and not by way of limitation, the feedback controller 228 is a proportional integral derivative controller or "PID." When the difference PV−SP (error "e") exceeds a predetermined value, excess fuel is present in the fuel cell system. The output signal 205 of the feedback controller 228 and the output signal 207 of the rate limiter 220 are combined in summer 206/223 to refine the estimate provided by rate limiter 220. The output 209/224 of summer 223 is a measure of the current (amps) available to meet the current request 218 of one or more loads. That is, if excess fuel is present in the fuel exhaust stream, then the current provided to the load may be increased. Alternatively, if error "e" is below a predetermined value, the current provided to the load is decreased (i.e., less current is provided to a given load and/or provision of current from the system to one or more loads is terminated).

Figure 3A:
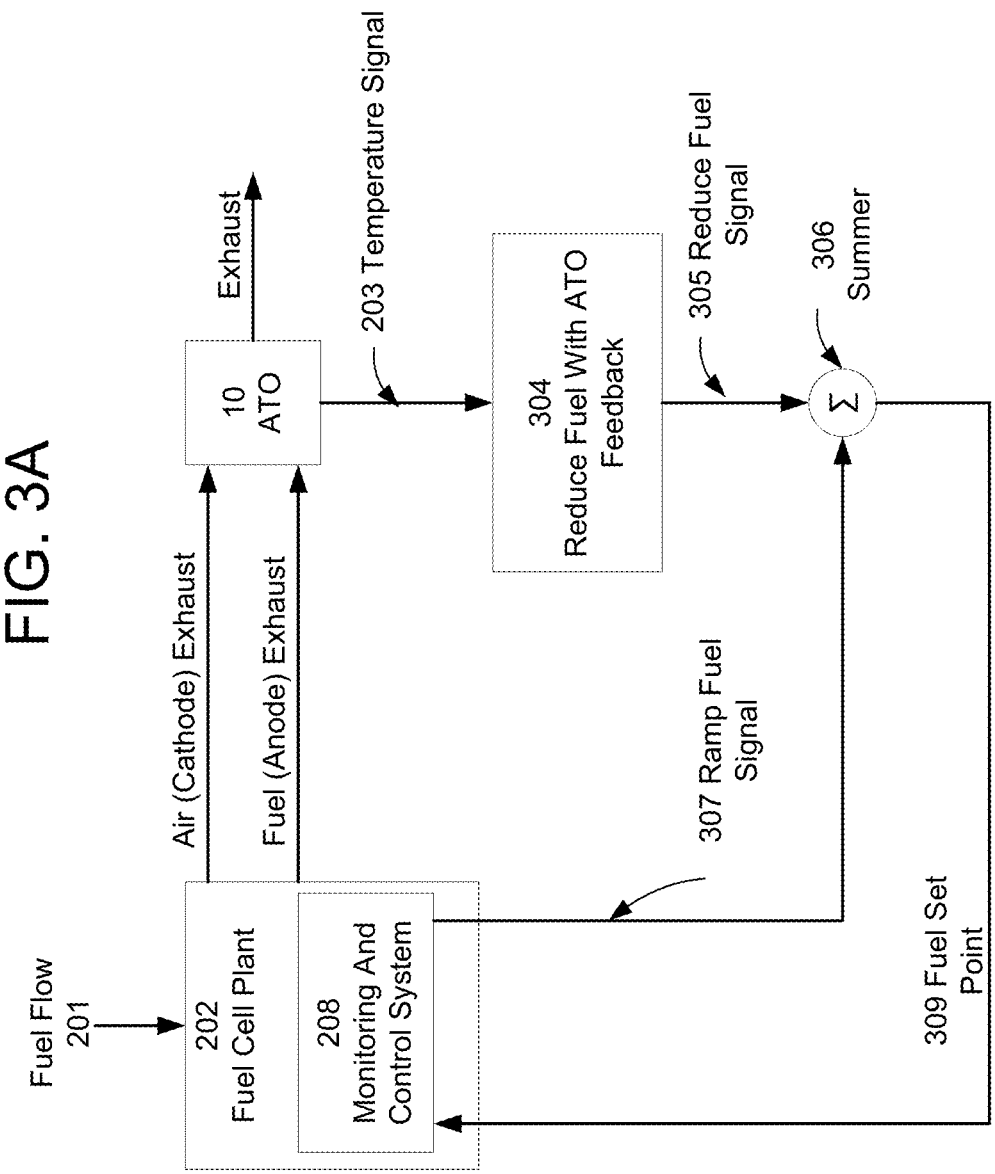
FIG. 3A is a block diagram illustrating a circuit that utilizes temperature of an ATO to control the fuel flowing into a fuel cell system according to an embodiment.

FIG. 3A is a block functional diagram illustrating a circuit that utilizes the temperature of an anode tail gas oxidizer (ATO) to control or limit the amount of excess fuel flowing into a fuel cell system according to another embodiment.

In this embodiment, a fuel inlet stream 201 is provided to a fuel cell plant or system 202 (e.g., via conduit 29 in FIG. 1). The fuel cell plant 202 (i.e., fuel cell stacks 9) sends the fuel and air exhaust streams to the ATO 10. The ATO temperature is a function of the amount of air and fuel exhaust that are oxidized in the ATO.

A fuel cell monitoring and control system 208 receives a current request signal 218 described above, and generates a ramp fuel signal 307 which is provided to a summer 306. The temperature of the ATO 10 and/or a rate of change of ATO temperature signal 203 is used to determine when excess fuel is available in the fuel cell plant 202, as, for example, when the fuel ramp is aggressively adding fuel, and when the fuel flow may be reduced. Signal 203 may be provided to a processor 304, which may be the same or different processor as system 208 or processor 204. Processor 304 generates a fuel flow reduction signal 305 which is provided to the summer 306. The summer 306 combines signal 306 with the ramp fuel signal 307 to generate a fuel set point signal 309. The fuel set point signal 309 is provided to the control system 208 and/or to a fuel inlet flow vale or blower (not shown for clarity) and/or to the anode recycle blower 213 to control or adjust the amount of fuel being provided to the fuel cell stacks 9. For example, if the ATO temperature is higher than desired, then the flow rate of the fuel inlet stream in conduit 29 in FIG. 1 is decreased by having the control system 208 or the system operator control a fuel inlet valve or blower and/or the flow rate of the anode exhaust recycle stream in conduit 121 in FIG. 1 is decreased by decreasing the rate of the blower 123 using the control system 208 or system operator command. Signals 203, 305, 307 and 309 may be current or voltage signals transmitted via wires or wireless signals having a certain amplitude and/or frequency. The fuel flow control keeps the ATO 10 from reaching extreme temperatures which may damage the ATO and reduce overall system emissions.

Figure 3B:
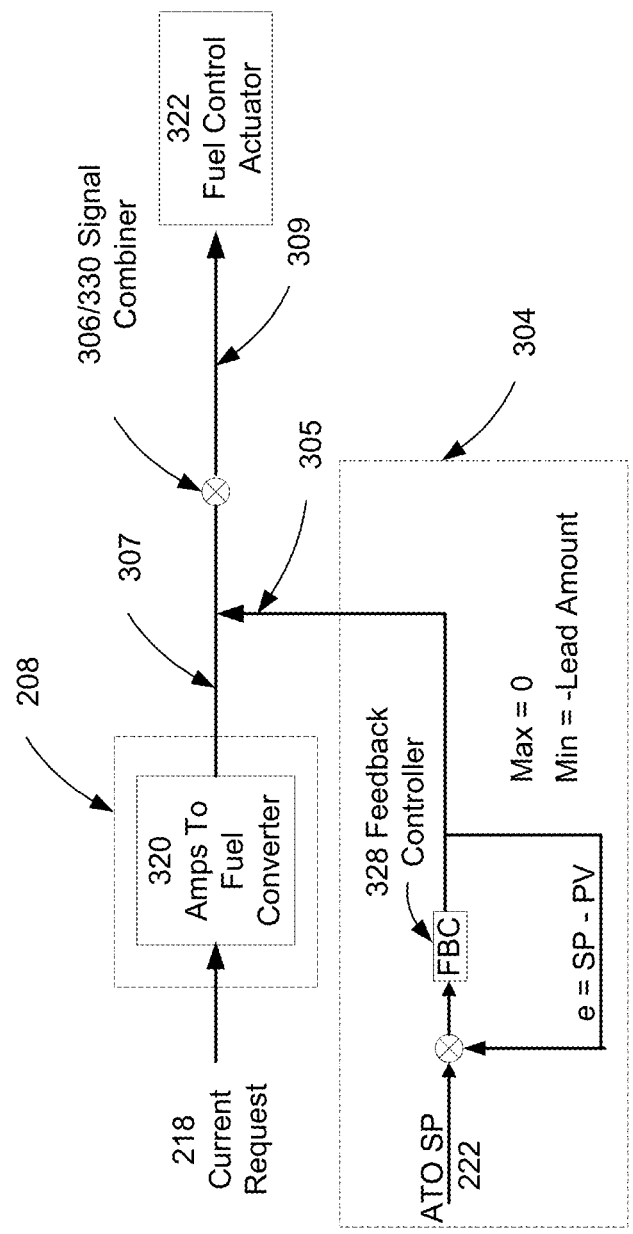
FIG. 3B is a block diagram illustrating an implementation of the load following circuit in FIG. 3A according to an embodiment.

FIG. 3B illustrates a non-limiting circuit implementation of the functional circuit diagram shown in FIG. 3A. A current request signal 218 described above is provided at an amps-to-fuel converter 320 (e.g., a processor that is part of system 208 or a separate processor). The amps-to-fuel converter 320 generates the signal 307, which is an estimate of the amount of fuel needed by the plant 202 to meet the current request signal 218. Converter 320 may generate the estimate based on a lookup table of current output of the fuel cell system for a given inlet and recycled fuel flow rate to the stack, a formula which correlates the current output to the fuel flow rate or any other similar method. As described above, signal 307 is provided into the signal combiner (i.e., summer) 306/330, which may be the same or different summer from summer 206.

The measured ATO temperature signal 203 is provided to the controller 304, which may be a feedback controller 328. Controller 328 compares a temperature set point 222/SP of the ATO 10 to the actual measured temperature 203/PV of the ATO 10. By way of illustration and not by way of limitation, the feedback controller 328 is a proportional integral derivative controller or "PID." When the difference SP−PV (error "e") is negative and exceeds a predetermined value, excess fuel is present in the fuel cell system that is not being utilized to provide additional current. For example, if the temperature in the ATO 10 is rising rapidly, either the fuel rate is too high or the load is not being brought on line fast enough to consume the excess fuel.

The output signal 305 (e.g., a current or voltage) of the feedback controller 328 is combined with signal 307 (e.g., a different current or voltage) in the signal combiner/summer 306/330. The output signal 309 from combiner 330 is used to modulate a fuel control actuator 322 (e.g., a fuel control valve or blower in the fuel inlet conduit 29 and/or the anode recycle blower 123) to reduce the fuel flow rate to the fuel cell stacks 9 if the ATO temperature is higher than desired. The output signal 305 of the feedback controller 328 is limited by a maximum value of 0 (when the measured ATO temperature equals the set point temperature, PV=SP, then signal 305 is zero) and by a minimum negative lead amount offset (i.e., the actual measured temperature PV of the ATO exceeds the set point temperature SP). The minimum lead amount assures that the fuel estimate of the amps-to-fuel converter 320 is reduced by some amount when the PV exceeds SP. In other words, the output signal 305 of controller 304/328 is zero if the ATO temperature is acceptable and the output signal 305 is negative (e.g., a negative voltage) if the ATO temperature is too high. The negative output signal 305 is subtracted from signal 307 by the combiner 330 and a lower magnitude signal 309 (i.e., a decreased voltage) is sent from combiner 330 directly to the actuator 322 and/or to the control system 208 which controls the actuator 322 when the ATO 10 temperature is too high. This lower magnitude signal 309 causes the actuator 322 to decrease the amount of fuel being provided to the fuel cells stacks 9.

Figure 4:
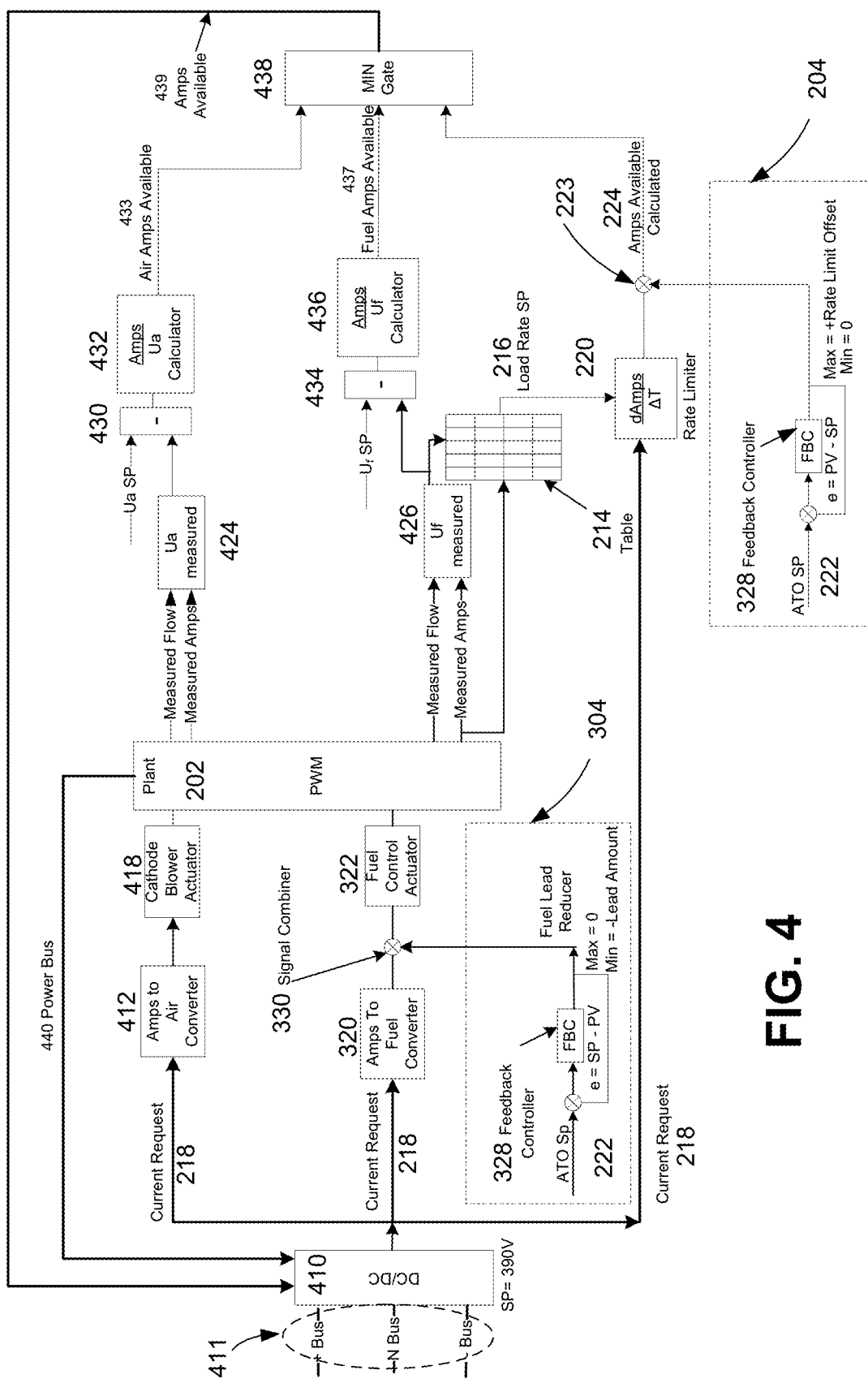
FIG. 4 is a block diagram illustrating a load following control system that utilizes temperature data from an ATO to determine a load rate and fuel flow and to limit an amount of excess fuel flowing into a fuel cell stack according to an embodiment.

FIG. 4 is a block diagram illustrating a load following control system that utilizes temperature data from an anode tail gas oxidizer (ATO) to determine a load rate and fuel flow and to limit an amount of excess fuel flowing into a fuel cell according to an embodiment.

In this embodiment, the feedback circuits illustrated in FIGS. 2B and 3B are incorporated into the overall system fuel cell system containing a fuel cell plant (also referred to as a power module) 202 (e.g., the hot box components, including fuel cell stacks 9 and ATO 10 illustrated in FIG. 1), electrical input/output components and controller(s) described above. The elements of FIGS. 2B and 3B described above and having the same numbers in FIG. 4 will not be described again with respect to FIG. 4 for brevity. The system of FIG. 4 provides fast load matching of the fuel cell while maintaining emissions control.

As illustrated in FIG. 4, a DC/DC converter 410 is connected to an output split bus 411, which is the power output of the fuel cell plant 202. The DC bus has a set point of 390V DC. However, this is not meant as a limitation.

Loads may be connected to the + bus and the − bus of the split bus. The bus 411 may be connected directly to one or more DC loads and/or it may be connected to one or more DC/AC converters for providing power to the electrical grid and/or to an AC load.

When a load is added to either leg or all legs of the split bus 411, a current request signal 218 (e.g., current or voltage) is issued by the DC/DC converter 410. The current request signal 218 is delivered to an air control path (upper part of the figure), a fuel control path (a middle part of the figure) and a load control path (lower part of the figure). An amps to air converter 412 determines an air flow rate needed to meet the current requested by the load from the current request signal 218. Converter 412 then provides the a control signal to the cathode blower actuator 418 and/or to the control system 208 (shown in prior figures) which controls the actuator 418 based on the air flow rate determination. The actuator 418 controls the air blower 125 (shown in FIG. 1) speed based on the air flow rate determination control signal from converter 412.

The measured air inlet and/or exhaust flow rate(s) from the power module 202 (i.e., measured by a flow meter and/or determined from air blower 125 speed) and current output by the power module 202 are delivered to a processor 424 which determines the power module measured air utilization (Ua). Processor 424 may be a separate processor or a part of the system controller 208. The measured air utilization and the desired air utilization set point are provided to a signal differentiator 430 and calculator 432 to determine the difference between an air utilization set point (Ua SP) and Ua. This difference is a measure of the "air amps" that are available which is provided as an output signal 433 from the calculator to a min gate 438. The difference measures the current that may be produced by increasing or decreasing the air supplied to the fuel cell system. Gate 438 and elements 430 and 432 may be part of the control system 208 or separate circuit elements.

The current request signal 218 is also delivered to the amps to fuel converter 320 as previously described in reference to FIG. 3B. The fuel control actuator 322 then controls the amount of fuel being provided to the fuel cell stacks 9 in the power module 202 based on the output of the converter 320 and the output of controller 304 (which is based on ATO temperature) as previously described in reference to FIG. 3B.

The current request signal 218 is also provided to the rate limiter 220, as previously described in reference to FIG. 2B. The measured fuel inlet and/or exhaust flow rate(s) from the power module 202 (i.e., measured by a flow meter and/or determined from fuel recycle blower 123 speed) and current output by the power module 202 are delivered to a processor 426 which determines the power module measured fuel utilization (Uf). Processor 426 may be a separate processor or a part of the system controller 208. As previously described in reference to FIG. 2B, the fuel utilization signal 210 is delivered to the lookup table 214. The load rate set point 216 from the table 214 and the current request 218 are processed in the rate limiter 220. The output of the rate limiter 220 and the output of controller 204 (which is based on the ATO temperature) are provided to the summer 223, and the output of the summer (i.e., load demand signal 209/calculated amps available signal 224) is also provided to the min gate 438.

The fuel utilization signal 210 is also provided from processor to a signal differentiator 434 and calculator 436 to determine the difference between a fuel utilization set point (Uf SP) and Uf. This difference is a measure of the "fuel amps" that are available which is provided as an output signal 437 from the calculator 436 to the min gate 438. The difference measures the current that may be produced by increasing or decreasing the fuel supplied to the fuel cell system. Elements 434 and 436 may be part of the control system 208 or separate circuit elements. Additional details of a method for determining the fuel utilization may be found in U.S. Pat. No. 8,211,583 issued on Jul. 3, 2012, titled "Derivation of control parameters of fuel cell systems for flexible fuel operation", which is incorporated herein by reference in its entirety.

As noted above, the air amps available signal 433, the fuel amps available signal 437 and the calculated amps available signal 224 (i.e., three different voltages) are provided to the minimum gate 438. The minimum gate 438 selects the smallest of the three signals (e.g., the lower voltage magnitude from voltages 433, 437 and 224) to produce an amps available signal 439. Signal 439 may either equal to the actual value (e.g., voltage) of the smallest of the three signals 433, 437 and 224, or it may comprise a different value (e.g., voltage) from the received signals 433, 437 and 224. This signal 439 is provided to the DC/DC converter 410 which then controls the output current (or power) provided from the power module 202 via a power bus 440 through the converter 410 into bus 411 to be provided to the load(s). Alternatively, signal 439 may be provided to the system controller 208 which then controls the amplitude of the direct current output from converter 410.

Thus, as shown in FIG. 4, the ATO temperature may be used by controller 304 to control the amount of fuel (e.g., fuel flow rate) being provided to the fuel cell stack(s) 9 to avoid a higher than desired ATO temperature which may damage the ATO, and/or by controller 204 to optimize the system fuel utilization and provide an optimum amount of current to the system load(s).

Figure 2C:
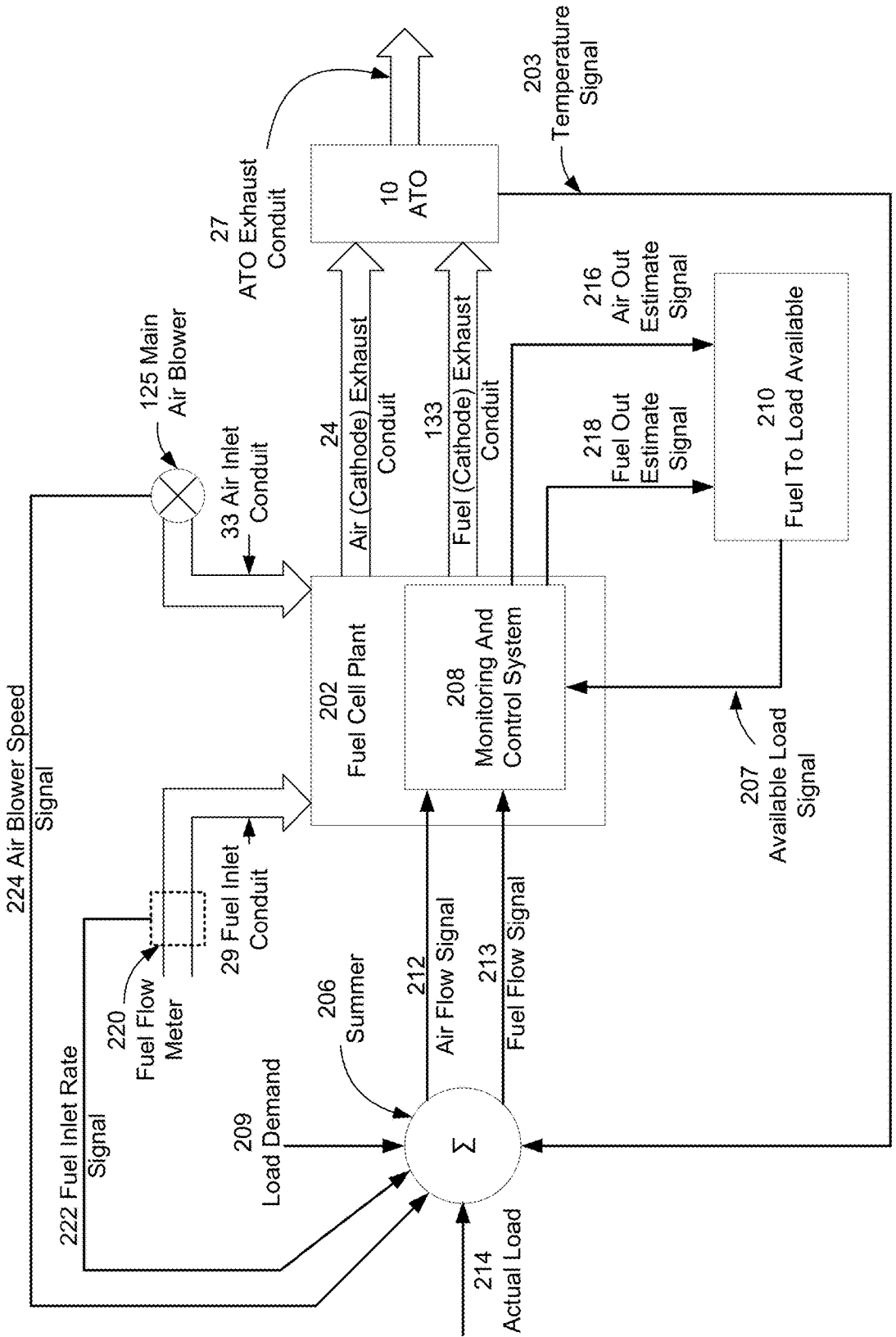
FIG. 2C is a block diagram of a circuit that utilizes the temperature of an anode tail gas oxidizer (ATO) to signal the presence of air and fuel in a fuel cell plant.

FIG. 2C is a block diagram of a circuit that utilizes the temperature of an anode tail gas oxidizer (ATO) 10 to signal the presence of air and fuel in a fuel cell plant and an increase or a decrease in the load (i.e., current demand) on a fuel cell system according to an embodiment.

The embodiment illustrated in FIG. 2C reflects the inherent delay between a decision to increase or decrease fuel and/or air to be delivered to a fuel cell plant and the actual arrival of the fuel and/or air in the fuel cell stack(s) 9. This lag is referred to herein as the "response delay time."

As illustrated in FIG. 1 and FIG. 2C, a fuel inlet stream is provided to a fuel cell plant 202 (e.g., via conduit 29). An air inlet stream is also provided to the fuel cell plant 202 (e.g., via conduit 33). The fuel cell plant 202 provides an air exhaust stream to an ATO (e.g., via conduit 24) and a fuel exhaust stream to the ATO (via conduit 133 in FIG. 1). The operation of the fuel cell plant is controlled by a monitoring and control system 208.

In this embodiment, the monitoring and control system 208 receives signals from a summer 206 and a controller 210. As used herein, a signal may be provided wirelessly or via a physical connection, such as an electrical wire or via a fiber optic connection. The controller 210 may be the same or different controller as the system 208.

A measured temperature of the ATO and/or the rate of change of ATO temperature signal 203 are provided from a sensor (e.g., ATO thermocouple) to a summer 206. The summer 206 also receives signals indicative of an actual system load 214, a load demand 209, a fuel inlet flow rate 222 and an air blower speed/air inlet flow rate 224. Signals 222 and 224 may be obtained by a flow meter, such as a fuel flow meter 220 located in the fuel inlet conduit 29, or other suitable measurement devices in conduits 29, 33, or by noting the air blower 125 speed to determine the air inlet flow rate 224. The summer 206 uses the temperature signal 203 from the ATO in combination with signals 209, 214, 222 and 224 to generate an air flow signal 212 and a fuel flow signal 213 which are communicated to the monitoring and control system 208.

The control system 208 receives signals 212 and 213 from the summer 206 and outputs an estimated air output signal 216 and an estimated fuel output signal 218 to controller 210. The monitoring and control system 208 may use lag compensator(s) or model calculations in addition to signals 212 and 213 to estimate when air and fuel are actually present in the fuel cell stacks 9 of plant 202 to generate the estimated output signals 216 and 218. The controller 210 uses these estimated output signals 216 and 218 to provide an available load signal 207 back to the monitoring and control system 208. The control system 208 then increases, decreases or maintains the same load magnitude on the fuel cell plant or system 202 subject to the available load signal 207 provided by controller 210.

In this way, the temperature of the ATO is used as a feedback signal to signal the flow rate and/or the presence of fuel and air in the fuel cell stacks 9 of the fuel cell plant 202 and to compensate for the response delay time errors that are present in the air flow signal 212 and fuel flow signal 213 used to generate available load signal 207. The ATO temperature is used by the summer 206 signal to system controller 208 to increase or decrease the air and fuel flow rate that would otherwise be signaled by only the actual load signal 214 and the load demand signal 209. As the estimated air/fuel flow rate signals 216, 218 approach the actual values, the available load signal 207 approaches zero and the fuel cell plant approaches steady state operation.

Figure 10:
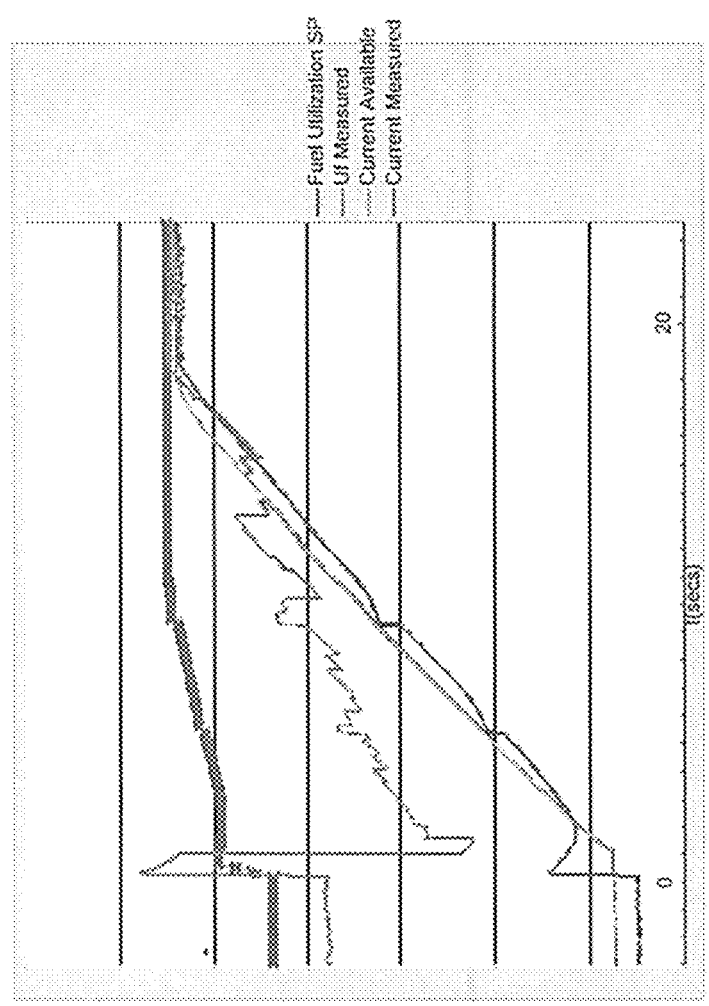
FIG. 10 is a graphical illustration of a load following current according to an embodiment.
Figure 11:
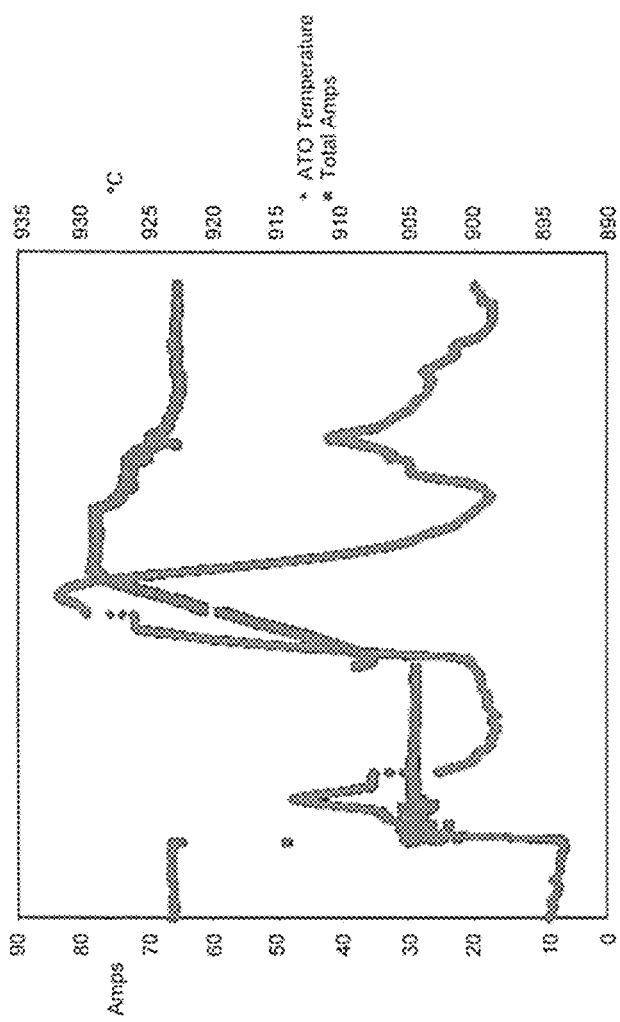
FIG. 11 is a graphical illustration of an anode tail gas oxidizer (ATO) response to current and fuel ramp according to an embodiment.
Figure 12:
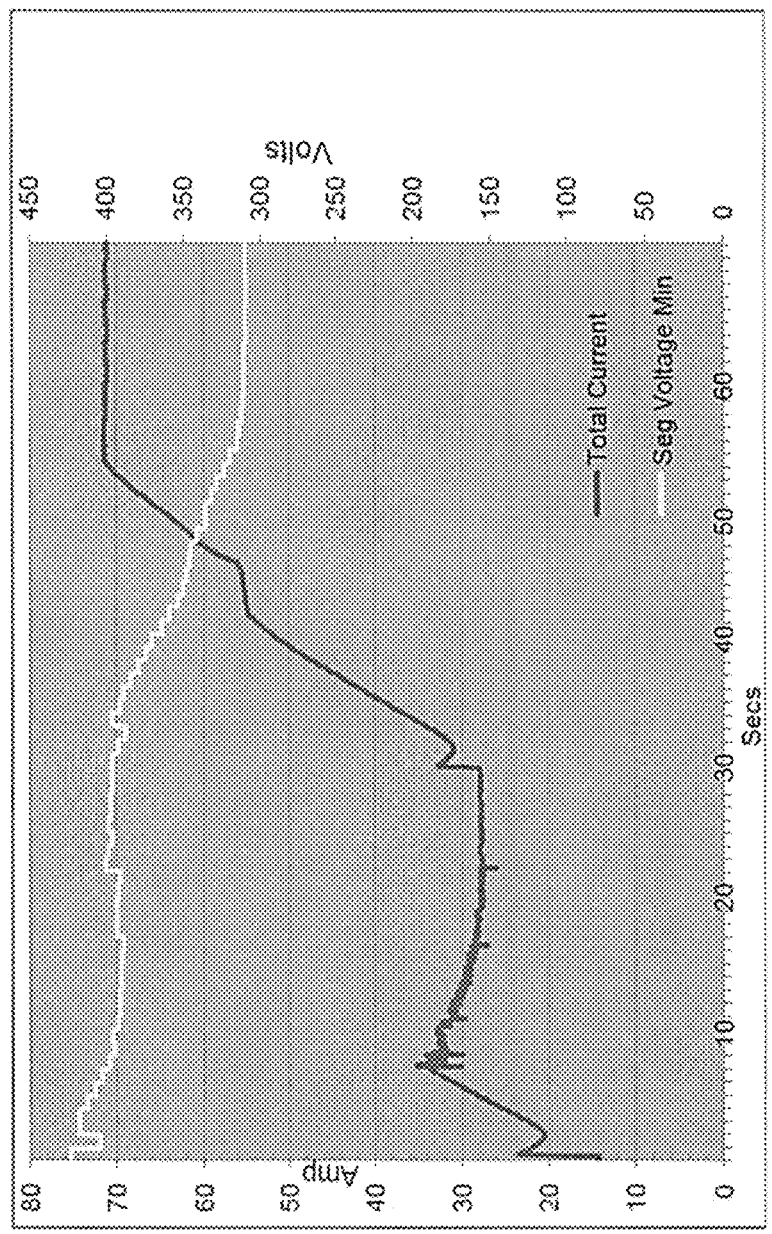
FIG. 12 is a graphical illustration of fuel cell stack response to load transients according to an embodiment.

The operation of the control circuits described above may be seen in graphical illustrations provided in FIGS. 10-12.

FIG. 10 is a graphical illustration of a load following current ramp according to an embodiment. The fuel utilization SP, the measured actual fuel utilization $U_f$, the measured current and the current available are plotted against time (in seconds). The measured current increases as the fuel utilization increases over the time period of the ramp. The measured current remains slightly below the available current over the duration of the ramp period.

FIG. 11 is a graphical illustration of an anode tail gas oxidizer (ATO) response to current and fuel ramp according to an embodiment. The ATO temperature in degrees Centigrade and total current in amps are plotted against time on right and left axes respectively. As illustrated, the ATO temperature set point is about 930 degree Centigrade. The fuel is trimmed to maintain the ATO temperature at or below this value. The ATO temperature can be seen as rising when the current drops because of excess fuel in the exhaust gases from the fuel cell system. The ATO temperature drops as the fuel to the fuel cell system is reduced because of the decreased load. The ATO temperature again rises to a peak as the fuel rate is increased to meet an increase in the load (reflected in the rising current ramp). The temperature of the ATO again declines as the fuel and current are matched and the amount of excess fuel in the ATO decreases.

FIG. 12 is a graphical illustration of a fuel cell response to load transients according to an embodiment. The total current and the voltage min from a fuel cell segment containing several fuel cell stacks 9 are plotted against time on left and right axes respectively. The control of the current and the voltage precludes severe transients and therefore prevents starvation of the fuel cell system.

Demand and Response Control

Figure 5:
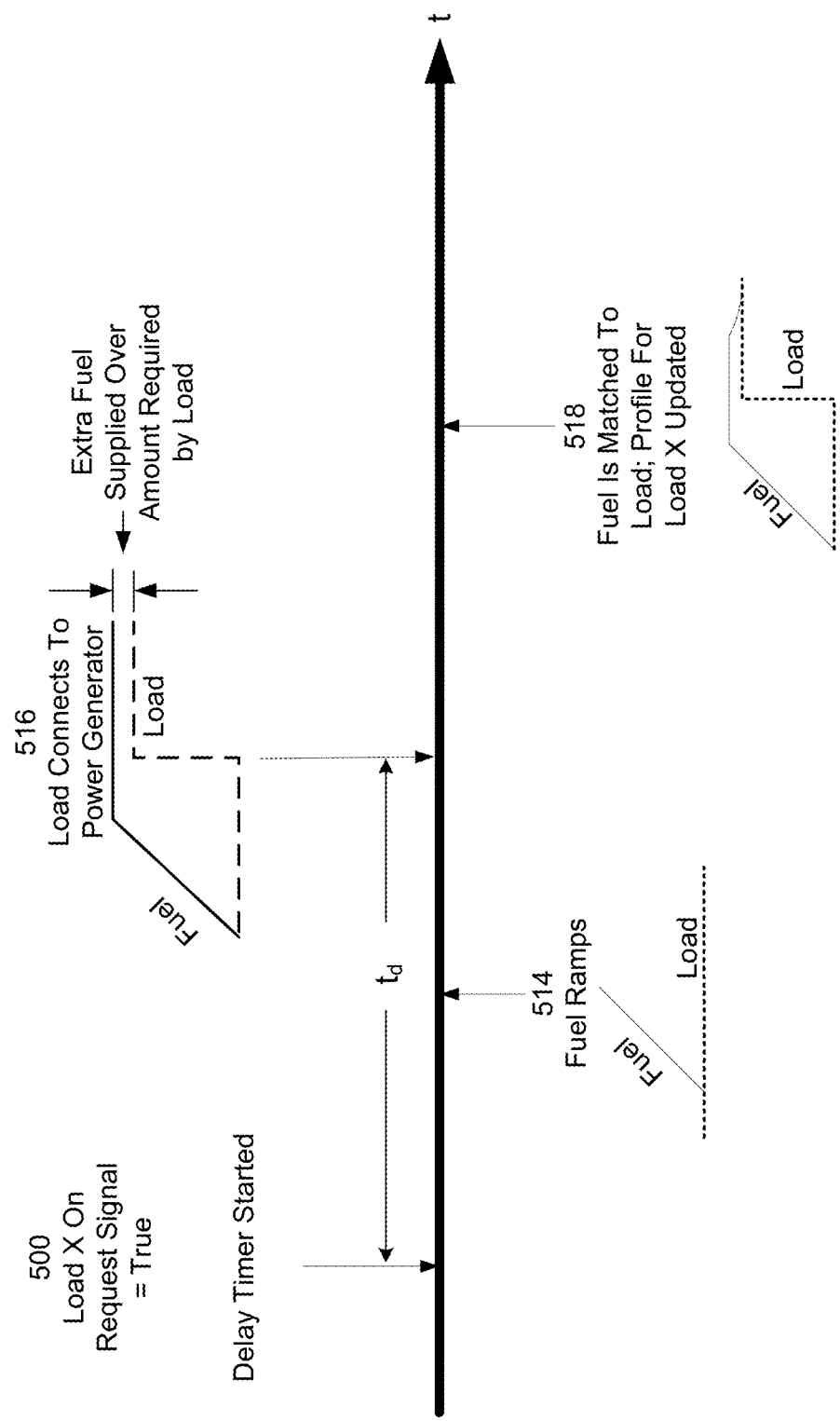
FIG. 5 is a block diagram illustrating a load management system that utilizes a delay timer according to an embodiment.

Alternative embodiments are also directed to controlling how a load is connected to the fuel cell system. FIG. 5 is a block diagram illustrating a load management system that utilizes a delay timer according to an embodiment.

In an embodiment, at a time 500, a load X issues a load demand signal that indicates the load is preparing to come on line. A delay timer is started at time 500 and runs for a period of $t_d$. At time 514, which is before the expiration of delay period $t_d$, the fuel to the power generation system (e.g., fuel cell system) is ramped up according to a pre-determined fuel flow rate. At time 516, the load connects to the power generation system. The delay period $t_d$ allows the power generation system to prepare for the load to come on line. The flow rate is greater than the rate necessary to support the load. At time 518, the fuel flow rate is matched (e.g., decreased) to the rate required to satisfy the power requirements of the load X (and the existing load (if any) on the system output bus before the addition of load X) and a profile of load X is updated to reflect the actual demand placed on the fuel cell system by the load. In an embodiment, the delay period and the fuel flow rate may be determined from the load profile. FIG. 7B illustrates a circuit for implementing the system illustrated in FIG. 5.

The controllers that control the load and fuel flow rate may be separate systems or may be implemented on a common system. Where separate controllers are utilized, the load controller may communicate via a wired or wireless network with controller that controls the fuel flow rate.

Figure 6:
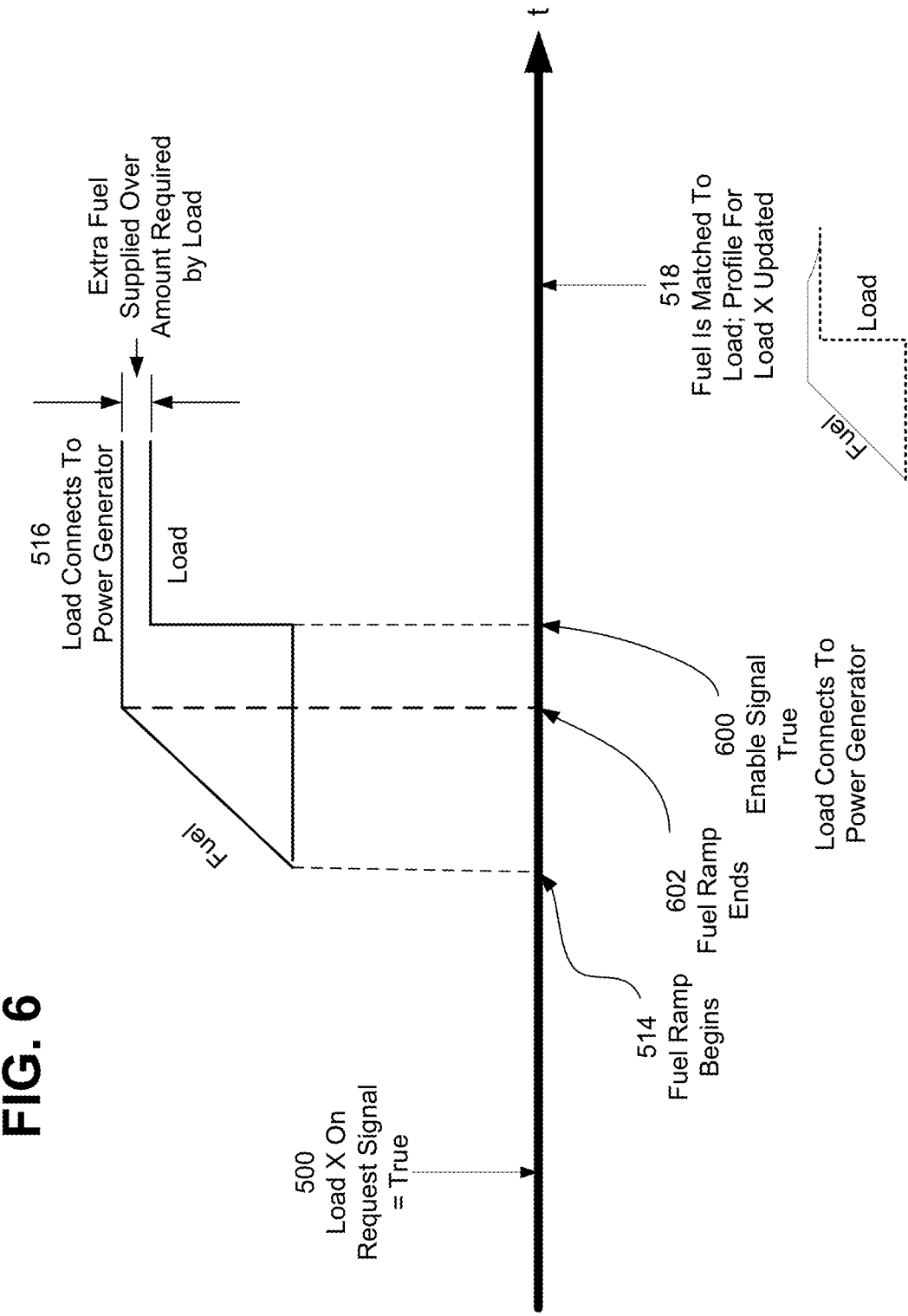
FIG. 6 is a block diagram illustrating a load management system that utilizes a load demand and load enable signal to an embodiment.

FIG. 6 is a block diagram illustrating a load management system that utilizes a load demand and load enable signal to an embodiment.

In this embodiment, two signals, a load demand signal and load enable signal, are used. As before, at a time 500, a load X issues a demand signal that it is preparing to come on line. At time 514, the fuel to the power generation system is ramped up or turned on if is not operating. At time 602, the fuel ramp ends. At some later time 600, the power generation system receives sufficient fuel (e.g., the fuel flow rate reaches a predetermined minimum value to provide the requested power to the load) and has reached a state in which it may support load X. At this time 600, an enable signal is sent from the power generation system controller to the load controller and the load connects to the power generation system. In this embodiment, the load X will not connect to the power generation system until the power generation system signals that it is ready. This method could eliminate the need for batteries or ultra capacitors in the fuel cell system. FIG. 7C illustrates a circuit for implementing the system illustrated in FIG. 6.

Figure 7A:
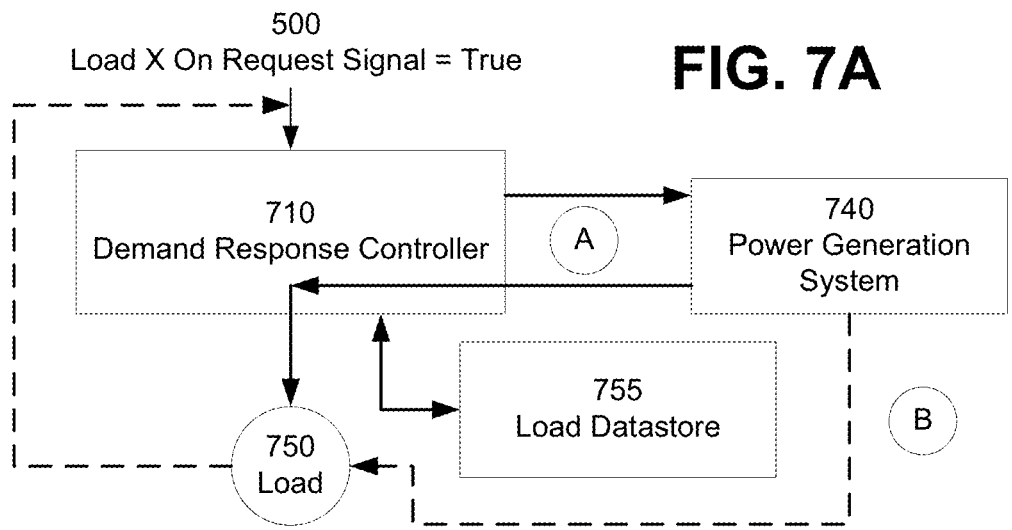
FIG. 7A is a block diagram illustrating the operation of a load request/enable relay according to an embodiment.
Figure 7B:
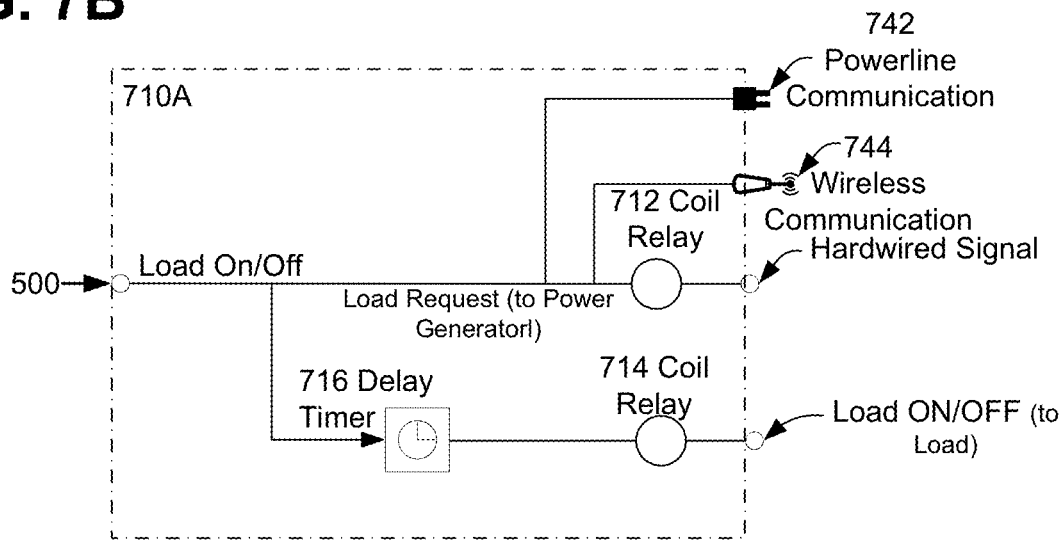
FIG. 7B is a block diagram illustrating the operation of a load request/enable relay using a delay time according to an embodiment.
Figure 7C:
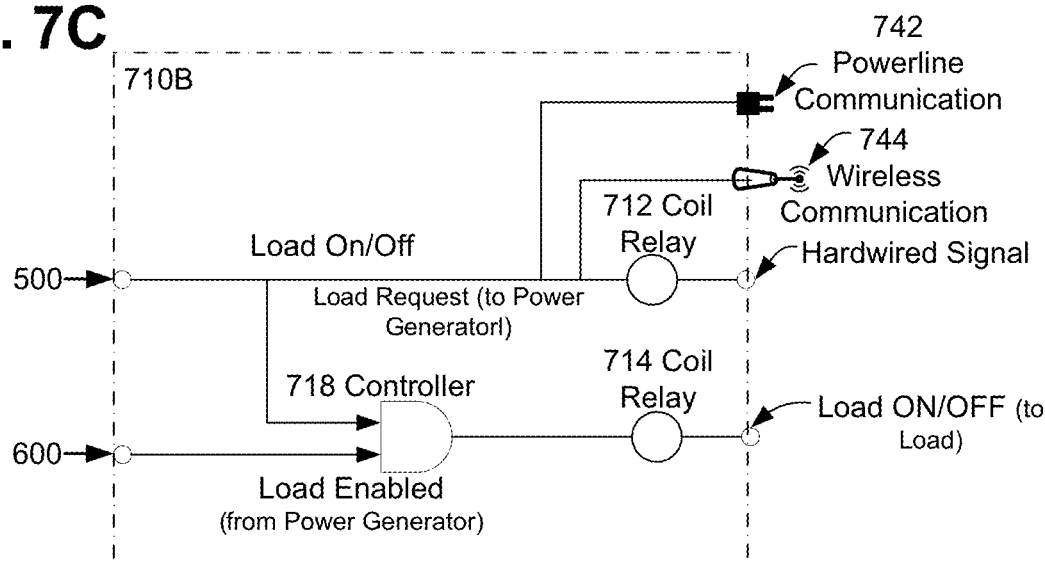
FIG. 7C is a block diagram illustrating the operation of a load request/enable relay using a signal controller according to an embodiment.

FIG. 7A illustrates the operation of a demand-response controller of a fuel cell system according to an embodiment. In an embodiment, the demand response controller 710 comprises a load request/enable relay, preload fuel ramp data, post load fuel/load matching data, and a post load adaptive controller. The preload fuel ramp data and the post load fuel/load matching data may be stored in a load data store 755. The preload fuel ramp data may be a predefined and/or a learned amount of current that is required to support a given load. This value needs only be sufficient to handle the load when it is connected to the power generation system. After the load is connected to the power generation system, the power generation system will dynamically match the desired amount of fuel to the total load based on the post load fuel/load matching data. For example, the fuel cell controller may adapt or learn, under the existing conditions (ambient temperature, time of day, etc), what amount of fuel to use next time a particular load turns on.

The demand-response controller 710 communicates with both the power generation system 740 and the load 750. The demand-response controller 710 receives a load demand signal 500 that normally switches the load ON and OFF. The demand-response controller 710 may utilize a delay timer as illustrated in FIG. 7B or an active controller as illustrated in FIG. 7C to start the fuel ramp and then connect load 750 and/or system 740 at time 516 or 600. The power generation system 740 may communicate with the load 750 indirectly via the controller 710 using wired or wireless communication link A in FIG. 7A, and/or directly via wired or wireless communication link B in FIG. 7A.

As illustrated in FIG. 7B, the load demand signal 500 provided by the load to the demand-response controller 710A signals the power generation system 740 to ramp up the fuel flow. Signal 500 controls an adjustable delay timer 716. The timer 716 determines when the load is to be connected to the power generation system 740. The signal to the power generation system 740 may be provided by a hardwired connection through coil relay 712 or via a network connection. As illustrated in FIG. 7B, the network connection may be accomplished using a power line communication interface 742 or a wireless interface 744. For example, the power line communication interface 742 may be compliant with a home plug standard and the wireless interface may be compliant with a 802.11x, Zigbee, Bluetooth or other short range protocol. The connection of the power generation system 740 to the load 750 is provided through a coil relay 714.

As illustrated in FIG. 7C, the load demand signal 500 provided by the load 750 to the demand-response controller 710B signals the power generation system 740 to ramp up the fuel flow. The load demand signal 500 is fed to an active controller 718 (such as an "AND" gate) that also is configured to receive a signal 600 from the power generator system 740. When the active controller 718 receives the signal 600 that the power generation system 740 is ready to supply the load 750, then load 750 is connected to the power generator 740. The signal to the power generation system may be provided by a hardwired connect through coil relay 712 or via a network connection. As illustrated in FIG. 7C, the network connection may be accomplished using a power line communication interface 742 or a wireless interface 744. For example, the power line communication interface 742 may be compliant with a home plug standard and the wireless interface may be compliant with a 802.11x, Zigbee, Bluetooth or other short range protocol. The connection of the power generation system 740 to the load 750 is provided through coil relay 714.

In an embodiment, the "load X on" load demand signal 500 comprises information about the load. For example, the load may be assigned an identifier that may be used to determine the type of load, the load size and a fuel-load profile from a load data store, such as load data store 755 shown in FIG. 7A. The fuel-load profile may be used in conjunction with the demand response controller 710A (FIG. 7B) to determine the delay for a particular load (time $t_d$ in FIG. 5) and the rate at which fuel is added to the fuel cell system. The fuel-load profile may be used in conjunction with the demand response controller 710B (FIG. 7C) to determine the rate at which fuel is added to the fuel cell system. In both cases, the rate at which fuel is added to the fuel cell system may be determined on the basis of load attributes such as, for example, a load priority measure, the size of the load, and the type of load.

As previously described, each time a load comes on line, the stored fuel-load profile is used to establish the rate at which fuel flow is increased to the fuel cell system. In an embodiment, when the fuel cell system reaches the state specified by the fuel-load profile, the fuel consumption of the fuel cell system is optimized to match the load X. The optimization operation may, for example, be performed by controllers in the power generation plant as described in U.S. Pat. No. 7,951,496, "Model Based Real-Time Optimization of Fuel Cell Clusters," issued on May 31, 2011, which application is incorporated herein by reference. In an embodiment, the demand response controller 710 obtains the results of the optimization process and updates the fuel-load profile stored in load data store 755 for the load X. In this way, the fuel-load profile of the load X is "learned" by the demand response controller 710.

In an embodiment, the demand response controller 710 may be further configured to disconnect the load X from the fuel cell system when conditions are detected that threaten the health of the system. Load shedding is described in detail below.

Load Shedding

In an embodiment, the circuits illustrated in FIGS. 7B and 7C may be used to shed load when the demand on a power generation system exceeds its capacity (sometimes referred to as an "overload" condition) and to add load when the power generation system has additional capacity. During an overload condition, the bus voltage and frequency drop and the power generation system disconnects completely. In an embodiment, a load shedding controller (e.g., the main fuel cell control system) or algorithm (not illustrated) maintains the load frequency, load voltage, and power generation system 740 availability by shedding loads in a specified order. In an embodiment, the algorithm takes into account the voltage and frequency on the power generation system output bus as well as the state of the power generation system. The load shedding controller may issue instructions to the demand response controller 710 to shed load 750 by controller coil relay 714 (e.g., power output from the power generation system 740 disconnected from the load 750 by the controller coil relay 714).

The addition of the state information provides more predictive control and can avoid overloading events. The following process variables may be used by load shedding controller to determine when load shedding is appropriate and select loads for shedding:

the voltage across the load;
rate of change of the voltage across the load;
load bus frequency;
fuel cell middle bus voltage (i.e., the three phase voltage output by a DC/DC converter and/or a DC/AC inverter); and
fuel utilization.

Critical Load Balancing With Multiple Fuel Cell Power Plants

Figure 8:
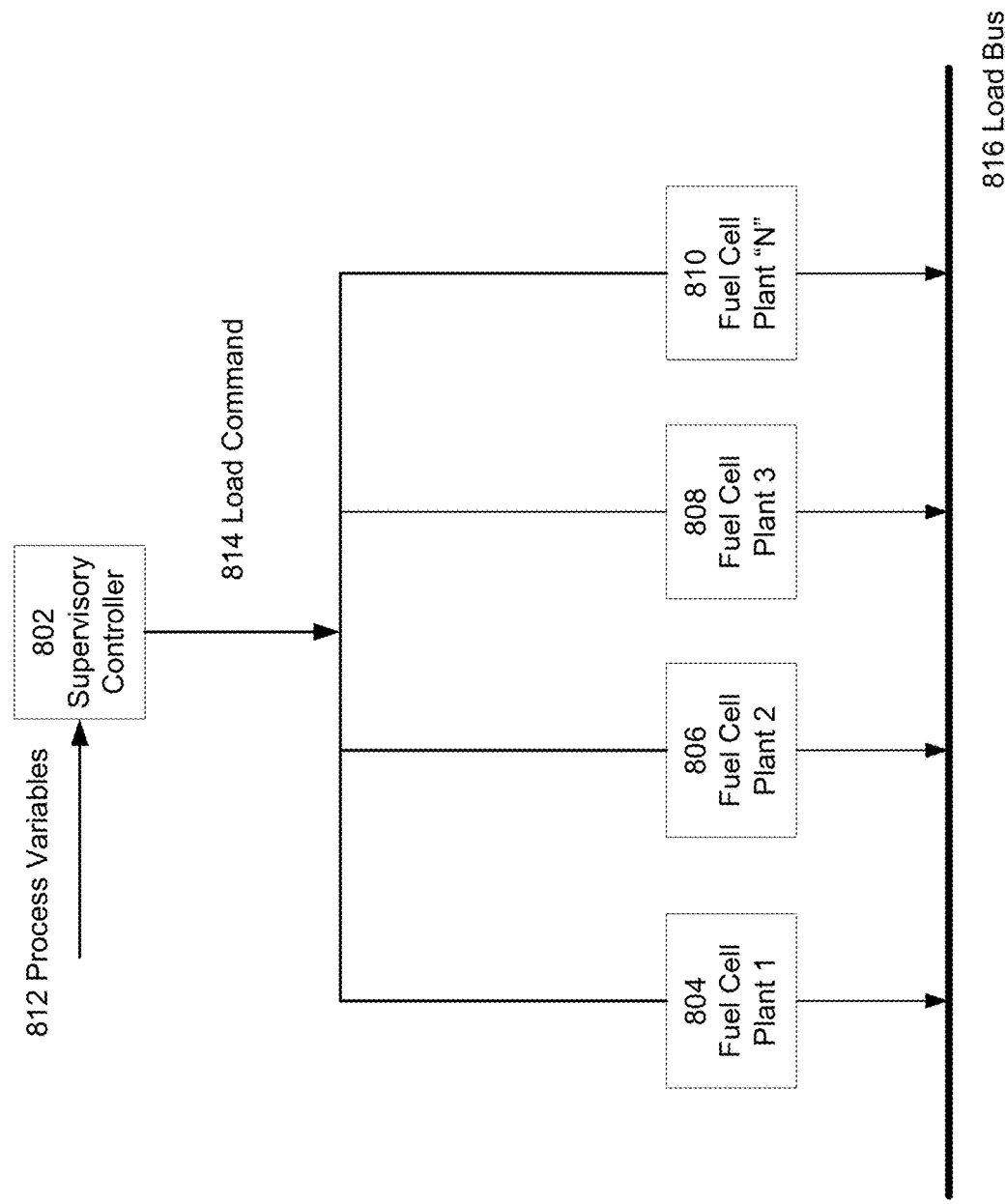
FIG. 8 is a block diagram illustrating a control system for a fuel cell system having "N" plants according to an embodiment.

The rate at which each plant ramps its power is dependent on its health. When a load is applied to multiple fuel cell plants, the individual output of each one will vary, and their total will provide the required power. FIG. 8 is a block diagram illustrating a fuel cell system having "N" plants 804, 806, 808 and 810 connected to a load bus 816. A fuel cell plant may comprise a power module containing a hot box 1 shown in FIG. 1. A hot box 1 contains one or more fuel stacks 9, such as plural SOFC stacks and balance of plant components. A sample fuel cell system is described in U.S. Published Application 2010/0009221 published on Jan. 14, 2010 (filed as Ser. No. 12/458,171 and incorporated herein by reference in its entirety). The components of a sample fuel cell system hot box are described in U.S. application Ser. No. 13/344,077, filed Jan. 5, 2012 and incorporated herein by reference in its entirety.

The "N" fuel cell plants are subject to load commands 814 issued by a supervisory controller 802. The load commands 814 may be communicated via a wired or wireless network. The supervisory controller 802 may be a standalone device or it may be a subsystem within a main fuel cell system controller. Using process variables 812 common to the plants and loads, the supervisory controller 802 may send a single load command to each power module to equalize the power output of each plant. When a plant has limited output or reduced load the remaining plants will increase output to make up for the loss.

Figure 9:
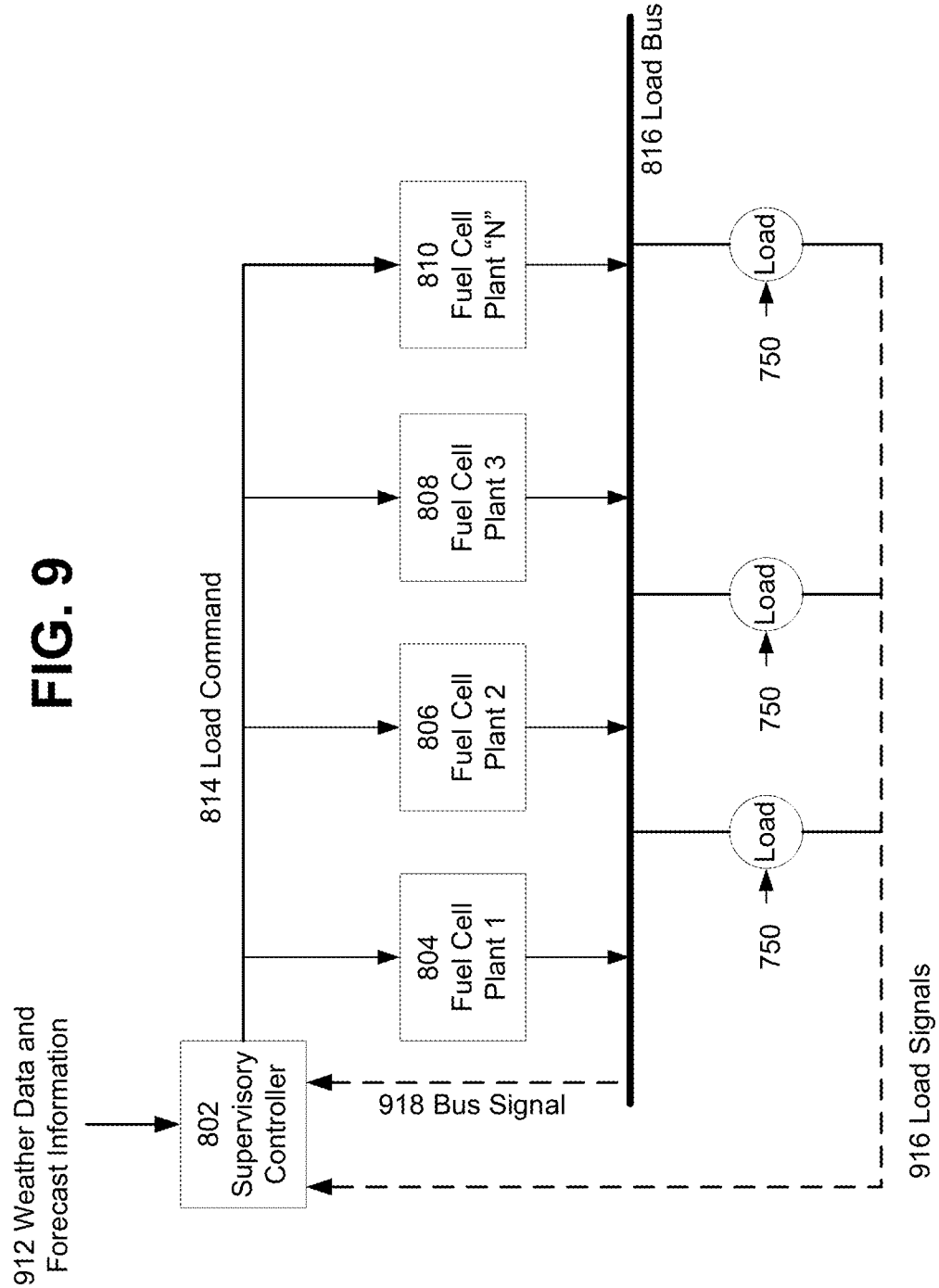
FIG. 9 is a block diagram illustrating a control system for a fuel cell system that is responsive to feedback signals according to an embodiment

FIG. 9 is a block diagram illustrating a supervisory controller that is responsive to signals. The supervisory controller 802 receives weather forecasting data signals 912, and load signals 916 and bus control signals 918. The signals may be communicated over a wired or wireless network. The bus signal 918 provides information regarding the status of the voltage and/or current being delivered to the bus 816 that supplies loads 750. The load signals 916 provide information regarding the state of each load (e.g., on/off, coming on line, going off line). The supervisory controller 802 may use this information and information about each fuel cell plant 804, 806, 808 and 810) and each load 750 to issue a single individual load command based on signals 912, 916, 918 to each fuel cell plant to regulate the bus voltage and power output of each plant in order to load balance and to optimize system lifetime. The weather forecasting data 912 permits the supervisory controller 802 to predict changes in the ambient conditions (e.g., pressure and humidity) that may affect the operational state of the fuel cell system and to optimize response time.

The foregoing method descriptions and the process flow diagrams are provided merely as illustrative examples and are not intended to require or imply that the steps of the various embodiments must be performed in the order presented. The various embodiments may be used separately on in any combination. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more block/flow diagrams have been used to describe exemplary embodiments. The use of block/flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as a computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. A method for controlling a fuel cell system, wherein the fuel cell system comprises one or more fuel cell stacks, the method comprising:

receiving from a sensor an anode tail gas oxidizer (ATO) temperature signal indicative of a measured ATO temperature, wherein the ATO receives air and fuel exhaust streams from the one or more fuel cell stacks and wherein the one or more fuel cell stacks provide current to one or more loads;

determining an amount of fuel by which to adjust a fuel estimate or an additional amount of current that can be generated by the one or more fuel cell stacks based on a determined fuel utilization of the one or more fuel cell stacks by comparing the measured ATO temperature and an ATO set point temperature; and controlling at least one of a fuel inlet flow to the one or more fuel cell stacks using the amount of fuel by which to adjust the fuel estimate or the current provided to the one or more loads using the additional amount of current that can be generated by the one or more fuel cell stacks.

2. The method of claim 1, wherein the step of controlling comprises:
determining by a controller from the ATO temperature signal whether the measured ATO temperature exceeds the ATO set point temperature by a predetermined value; and
varying a magnitude of least one of the fuel inlet flow to the one or more fuel cell stacks or the current provided to the one or more loads in response to the measured ATO temperature exceeding the ATO set point temperature by the predetermined value.

3. The method of claim 1, wherein:
the step of determining comprises determining from the ATO temperature signal whether excess fuel is present in the one or more fuel cell stacks; and
the step of controlling comprises at least one of increasing the current to the one or more loads or decreasing the fuel inlet flow rate to the one or more fuel cell stacks when excess fuel is present in the one or more fuel cell stacks.

4. The method of claim 1, wherein the step of controlling comprises controlling the fuel inlet flow to the one or more fuel cell stacks.

5. The method of claim 4, wherein the step of controlling comprises at least one of varying a fresh fuel inlet stream flow rate to the one or more fuel cell stacks or varying a recycling rate of a fuel cell stack anode exhaust stream into the one or more fuel cell stacks.

6. The method of claim 5, wherein the step of controlling comprises:
at least one of increasing the fresh fuel inlet stream flow rate to the one or more fuel cell stacks or increasing the recycling rate of the fuel cell stack anode exhaust stream into the one or more fuel cell stacks when the measured ATO temperature exceeds the ATO set point temperature by a first predetermined value; and
at least one of decreasing the fresh fuel inlet stream flow rate to the one or more fuel cell stacks or decreasing the recycling rate of the fuel cell stack anode exhaust stream into the one or more fuel cell stacks when the measured ATO temperature is less than the ATO set point temperature by a second predetermined value.

7. The method of claim 1, wherein the step of controlling comprises controlling the current provided to the one or more loads.

8. The method of claim 7, wherein the step of controlling comprises:
increasing the current when the measured ATO temperature exceeds the ATO set point temperature by a first predetermined value; and
decreasing the current when the measured ATO temperature is less than the ATO set point temperature by a second predetermined value.

9. The method of claim 1, further comprising:
receiving a current request from the one or more loads;
determining from the current request an estimate of a fuel flow ramp to be applied to the fuel inlet flow to meet the current request;
determining from the ATO temperature signal whether excess fuel is present in the one or more fuel cell stacks; and
decreasing the estimated fuel flow ramp by an amount of the excess fuel when excess fuel is present in the one or more fuel cell stacks.

10. The method of claim 1, wherein the ATO receives all of its incoming air from a fuel cell stack cathode exhaust stream and all of its incoming fuel from a fuel cell stack anode exhaust stream.

11. A system, comprising:
a fuel cell system, wherein the fuel cell system comprises one or more fuel cell stacks and an anode tail gas oxidizer (ATO), wherein the ATO receives air and fuel exhaust streams from the one or more fuel cell stacks and wherein the one or more fuel cell stacks provide current to one or more loads;
a temperature sensor configured to obtain an ATO temperature signal indicative of a measured ATO temperature; and
a controller configured to perform operations comprising:
receiving the ATO temperature signal from the sensor;
determining an amount of fuel by which to adjust a fuel estimate or an additional amount of current that can be generated by the one or more fuel cell stacks based on a determined fuel utilization of the one or more fuel cell stacks by comparing the measured ATO temperature and an ATO set point temperature; and
controlling at least one of a fuel inlet flow to the one or more fuel cell stacks using the amount of fuel by which to adjust the fuel estimate or the current provided to the one or more loads using the additional amount of current that can be generated by the one or more fuel cell stacks.

12. The system of claim 11, wherein the operation of controlling:
comprises determining from the ATO temperature signal whether the measured ATO temperature exceeds the ATO set point temperature by a predetermined value; and
varying a magnitude of least one of the fuel inlet flow to the one or more fuel cell stacks or the current provided to the one or more loads in response to the measured ATO temperature exceeding the ATO set point temperature by the predetermined value.

13. The system of claim 11, wherein:
the determining operation comprises determining from the ATO temperature signal whether excess fuel is present in the one or more fuel cell stacks; and
the controlling operation comprises at least one of increasing the current to the one or more loads or decreasing the fuel inlet flow rate to the one or more fuel cell stacks when excess fuel is present in the one or more fuel cell stacks.

14. The system of claim 11, wherein the controller is further configured to perform operations comprising:
receiving a current request from the one or more loads;
determining from the current request an estimate of a fuel flow ramp to be applied to the fuel inlet flow to meet the current request;
determining from the ATO temperature signal whether excess fuel is present in the one or more fuel cell stacks; and
decreasing the estimated fuel flow ramp by an amount of the excess fuel when excess fuel is present in the one or more fuel cell stacks.

15. The system of claim 11, wherein the ATO receives all of its incoming air from a fuel cell stack cathode exhaust stream and all of its incoming fuel from a fuel cell stack anode exhaust stream.

16. The system of claim 11, wherein the operation of controlling comprises controlling the fuel inlet flow to the one or more fuel cell stacks.

17. The system of claim 11, wherein the operation of controlling comprises controlling the current provided to the one or more loads.

18. The system of claim 11, wherein the operation of controlling comprises both controlling the fuel inlet flow to the one or more fuel cell stacks and controlling the current provided to the one or more loads.

\* \* \* \* \*